United States Patent [19]

Ohara et al.

[11] Patent Number: 4,969,000
[45] Date of Patent: Nov. 6, 1990

[54] CAMERA SYSTEM

[75] Inventors: Tsunemasa Ohara, Tokyo; Masayoshi Kiuchi, Kanagawa; Tetsuya Nishio, Tokyo, all of Japan

[73] Assignee: Canon Kabushiki Kaisha, Tokyo, Japan

[21] Appl. No.: 390,531

[22] Filed: Aug. 7, 1989

[51] Int. Cl.$^5$ .............................................. G03B 1/18
[52] U.S. Cl. .................................... 354/173.1; 354/214
[58] Field of Search ......... 354/173.1, 173.11, 212–216

[56] References Cited

U.S. PATENT DOCUMENTS 4,616,913 10/1986 Suzuki et al. ..................... 354/173.1
4,673,272 6/1987 Suzuki et al. .................... 354/173.11
4,816,851 3/1989 Fukahori et al. ................. 354/173.1

Primary Examiner—L. T. Hix
Assistant Examiner—David M. Gray
Attorney, Agent, or Firm—Fitzpatrick, Cella, Harper & Scinto

[57] ABSTRACT

In a photographic device including a camera body having at least one motor built therein for driving at least one of a film winding transmission system, a charging transmission system and another transmission system, and an accessory detachably mounted on the camera body and having an auxiliary motor built therein, a switching mechanism is arranged for switching over the transmission of power in response to the mounting of the accessory on the camera body so that at least one of the film winding transmission system, the charging transmission system and the other transmission system is not able to be connected to the motor built in the camera body, and the one transmission system not connected thereto is able to be driven by the auxiliary motor built in the accessory.

16 Claims, 32 Drawing Sheets

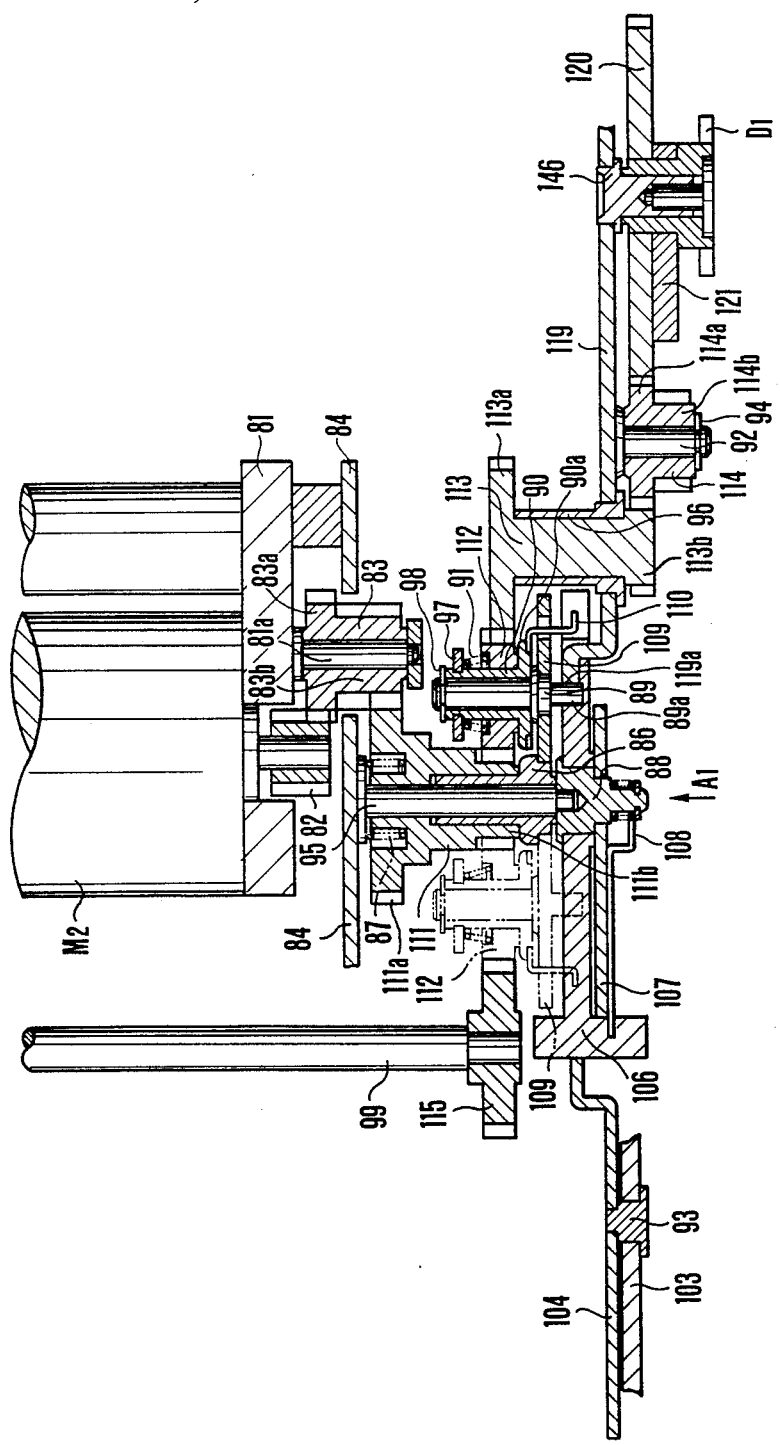

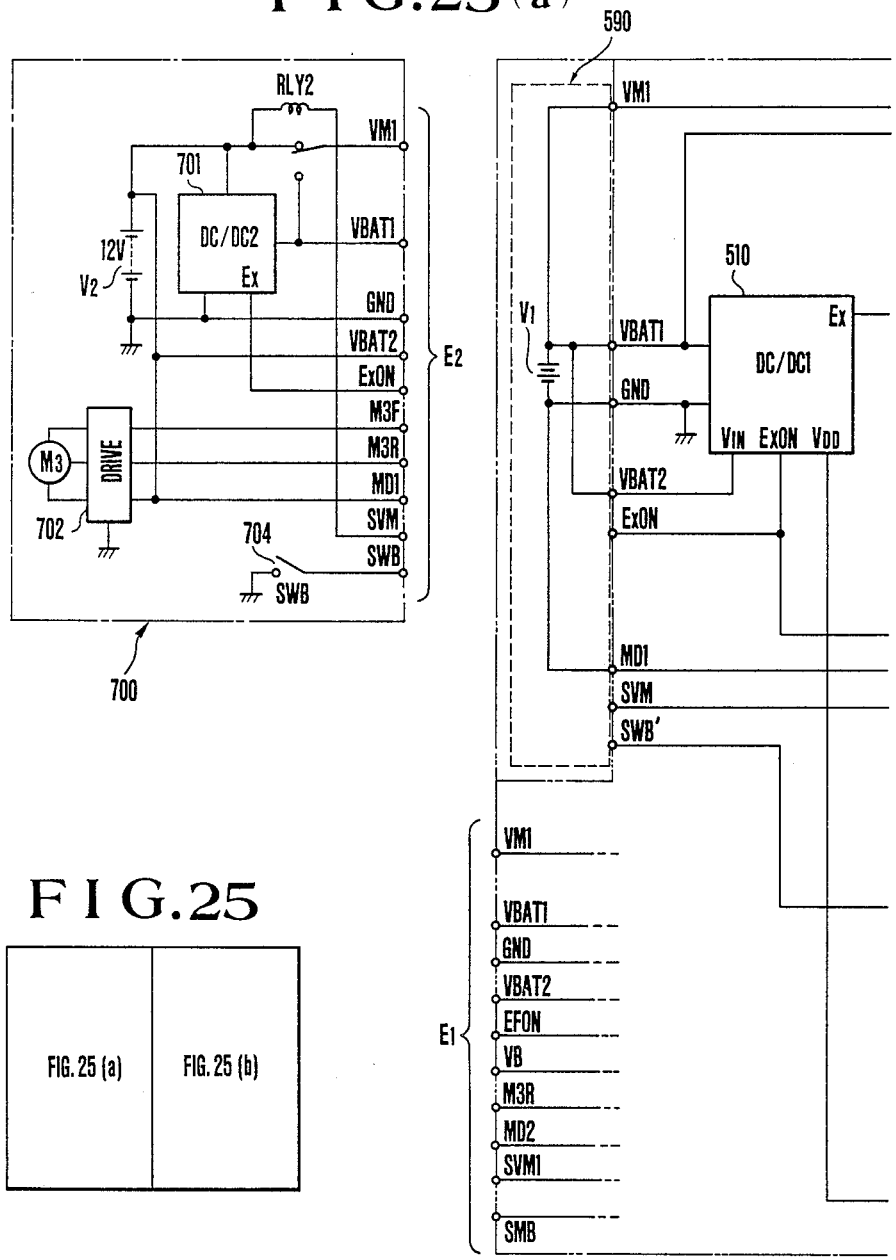
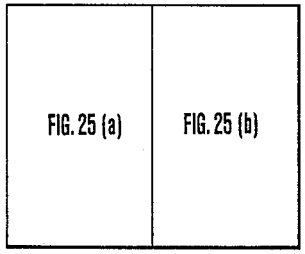
FIG.25(a)
FIG.25

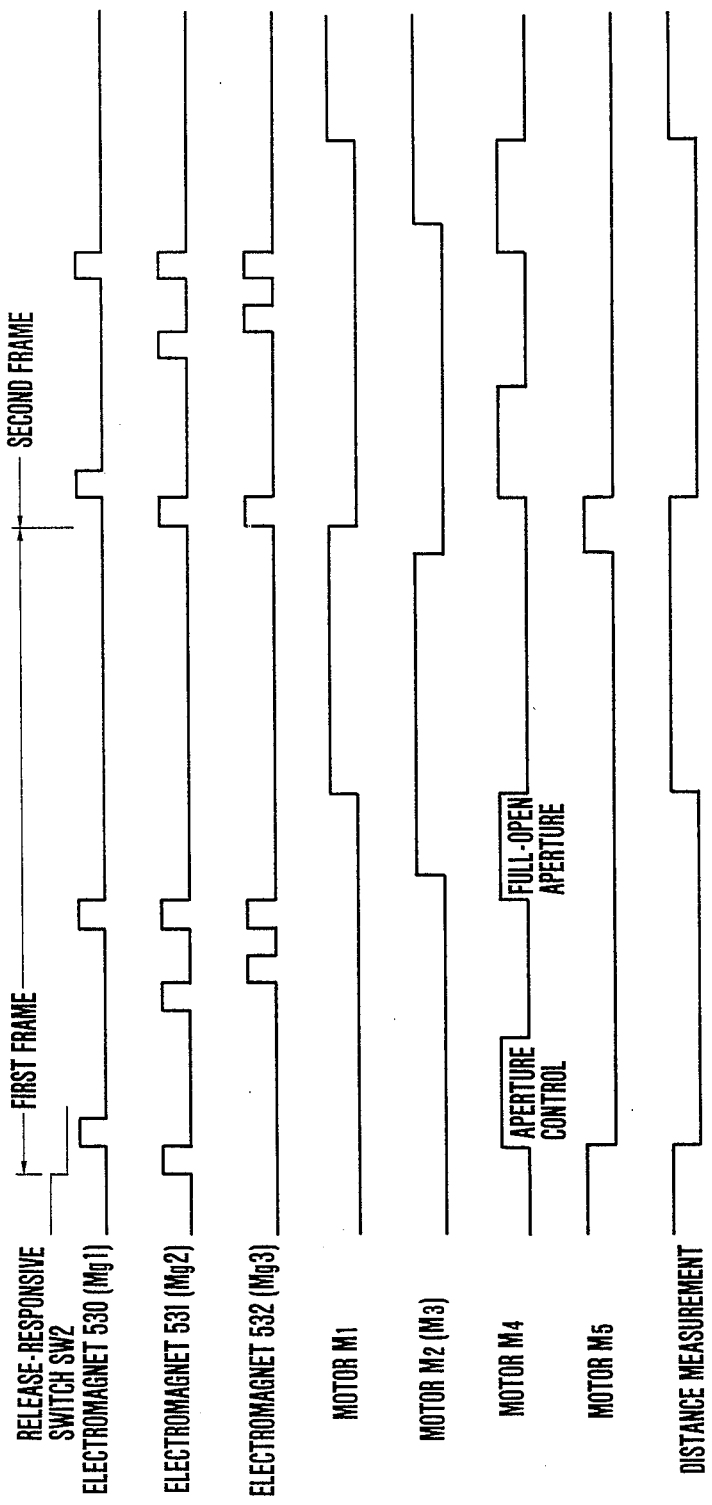

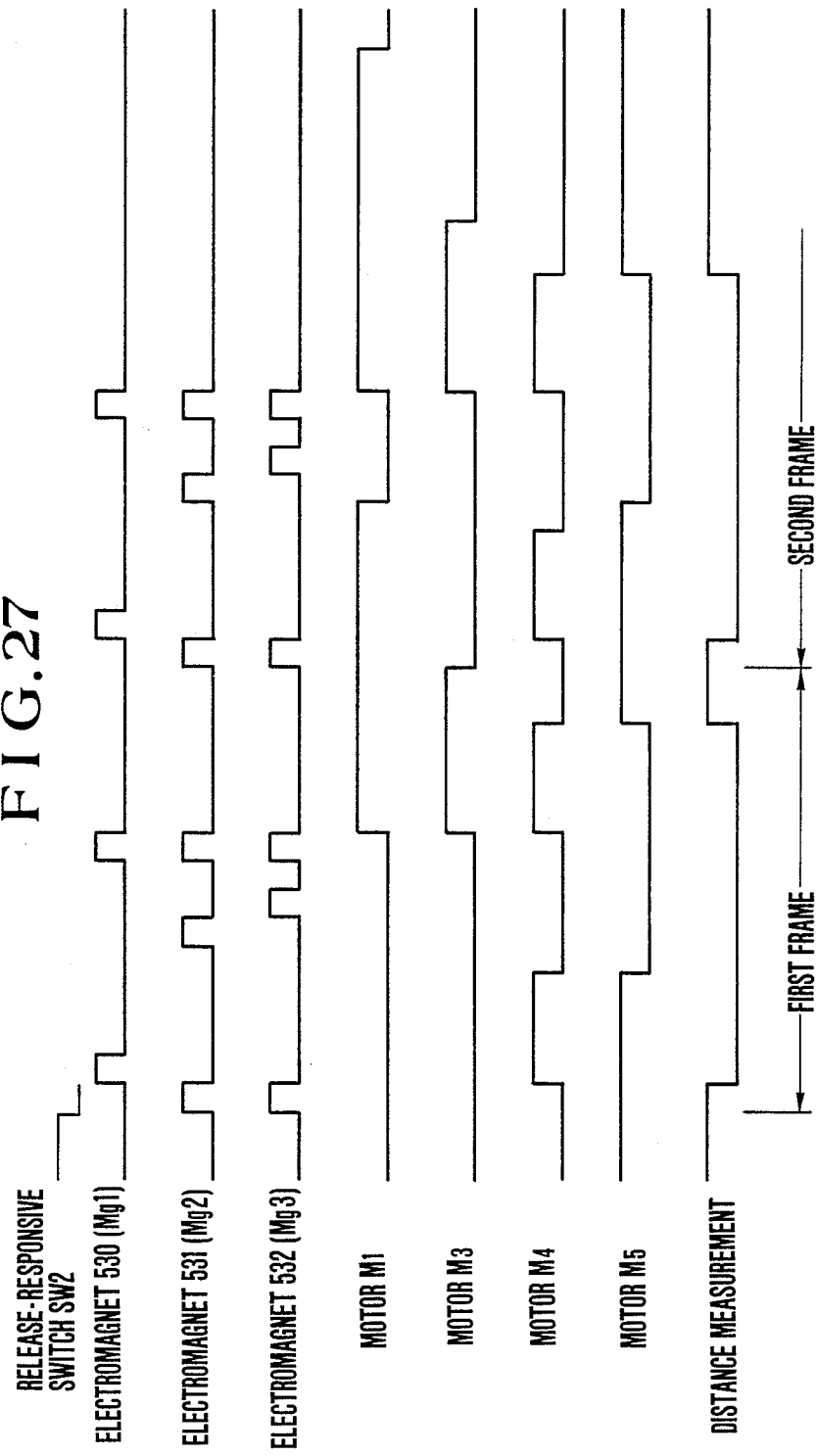

FIG. 29
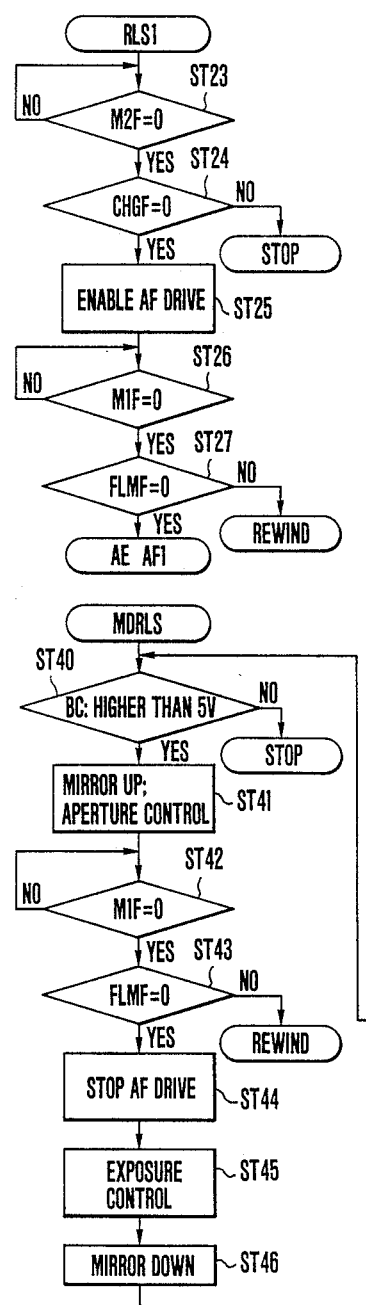
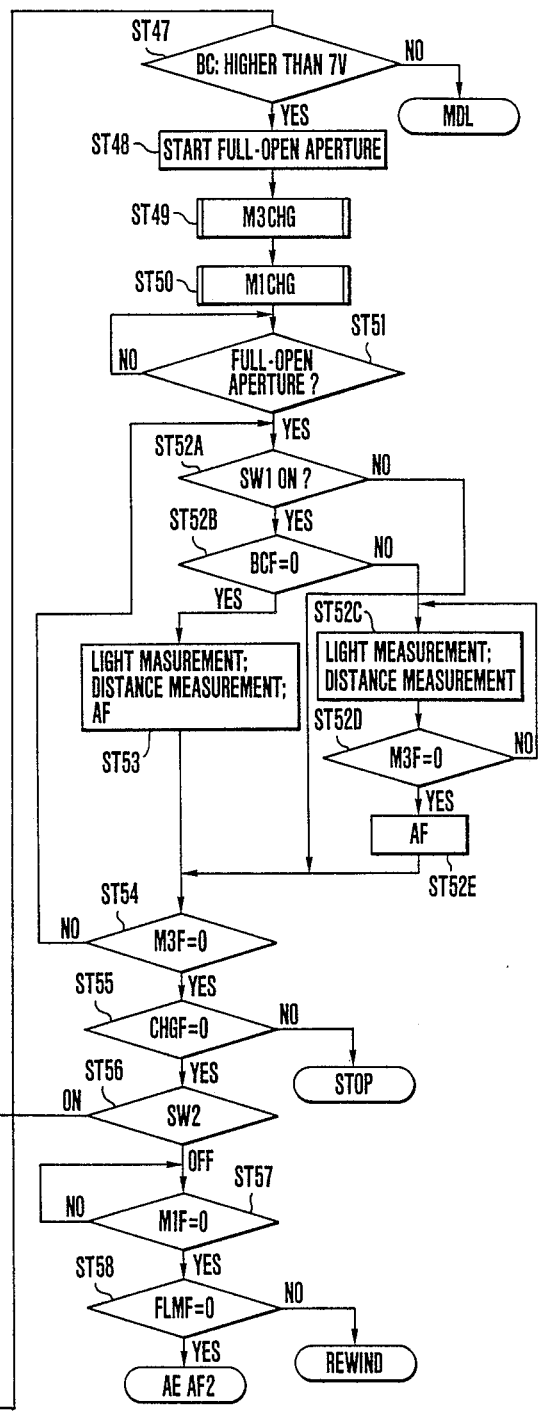

F I G. 30
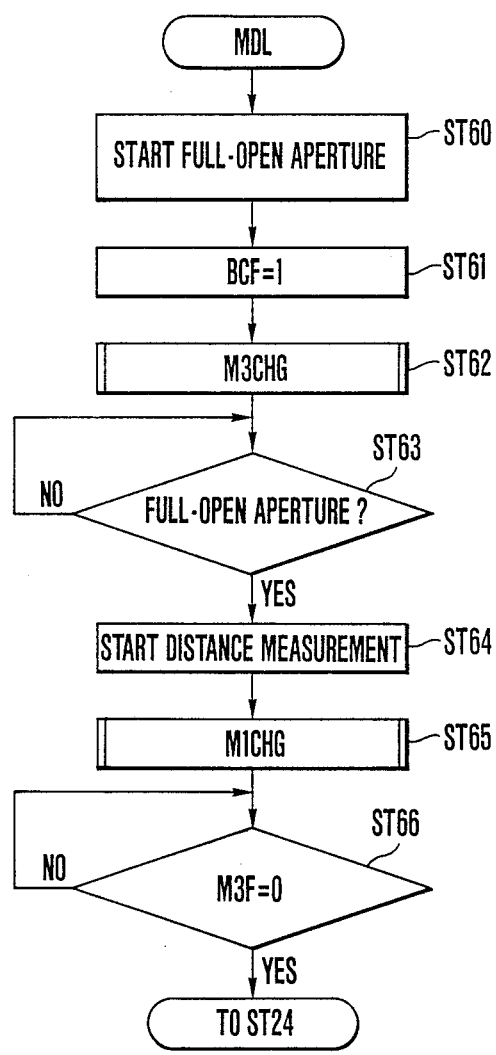

CAMERA SYSTEM

BACKGROUND OF THE INVENTION

1. Field of the Invention

This invention relates to a camera system of the kind permitting use of a motor drive device by mounting the device on a motor-incorporating camera.

2. Description of the Related Art

Many of the cameras provided these days are arranged to automatically perform not only film winding and rewinding but also a shutter charging action, etc. by using the driving force of a motor incorporated in the camera. The cameras of this kind are disclosed, for example, in U.S. Pat. No. 4,816,851, No. 4,616,913, No. 4,673,272, etc.. A preparatory operation for photographing can be greatly simplified by the motor-incorporating type camera which is capable of automatically performing the above-stated actions of varied kinds. The camera of this kind is favored by the users as it enables them to concentrate their attention on picture composition.

However, the relish and requirements of camera users are diverse. Therefore, it is hardly possible to satisfy all the requirements of the users with a single camera unit even by any of recent motor-incorporating type cameras. For example, some camera users prefer to have a smaller camera even at the expense of a high shutter speed. Some other users prefer to have a higher shutter speed even at the expense of a smaller size of the camera. Meanwhile, some users wish to have the camera arranged to permit selection of a film frame feeding speed from among varied speeds according to the purpose of use.

In order to meet the diverse requirements of the users, the motor-incorporating type camera is preferably arranged to permit a motor drive device to be mounted on the camera. However, the conventional motor-incorporating type camera is arranged in a manner unsuitable for mounting any additional motor drive device as the such cameras have been designed under a desire to have the motor drive device incorporated also in a manual operating type camera. Further, any attempt to have the conventional motor drive device mounted on the conventional motor-incorporating type camera would bring about the following problems (i) to (iii), which have prevented actual mounting of the conventional motor drive device on the conventional motor-incorporating type camera:

(i) If a motor drive device of the conventional type is mounted on the conventional motor-incorporating type camera, a power source and a related power transmission mechanism assembly must be arranged outside the camera in parallel with, and separately from, another power source and a related power transmission mechanism assembly which are arranged inside the camera. When the motor drive device is mounted, the power source and the power transmission mechanism would be left idle to cause the total weight of the camera to include a dead weight, which would unnecessarily be carried by the camera operator.

(ii) Generally, a power transmission system arranged between a motor and a load includes a reduction gear train. If the conventional motor drive device is mounted on the conventional motor-incorporating type camera in the same manner as mounting it on the conventional manual operating type camera, the driving power transmission system of the motor drive device would be connected to the internal power transmission system of the camera at a point close to the load of the internal power transmission system. Under such a condition, the reduction gear train disposed inside the camera would be driven by the motor disposed within the motor drive device. As a result, an extremely great load would be imposed on the motor. This would require the motor drive device to have a battery of a large capacity disposed within the device . and also to have the power transmission mechanism strong enough to be capable of transmitting a large torque. To meet these requirements, the motor drive device would become large, heavy and expensive.

(iii) With the motor drive device mounted on the motor-incorporating type camera, if the power transmission system of the motor drive device directly engages a load, such as a film winding mechanism, a shutter charging mechanism or the like disposed within the camera, the load on the motor disposed within the motor drive device could be minimized to prevent the size, weight and cost of the motor drive device from increasing. In actuality, however, the load within the camera, such as the film winding or shutter charging mechanism or the like, is disposed away from a part mechanically connecting the power transmission system of the motor drive device to that of the camera. The power transmission system of the motor drive device thus cannot be connected directly to the load disposed within the camera. Further, any design to have the power transmission system of the motor drive device connected directly to the load within the camera would result in extremely complex structural arrangement of the two power transmission systems.

SUMMARY OF THE INVENTION

It is an object of this invention to provide a camera system comprising in combination a novel motor-incorporating type camera which is arranged to permit a motor drive device to be mounted thereon and includes a power mechanism which is arranged in a rational manner; and a novel power drive device which is arranged to rationally share loads with the internal power mechanism of the camera when the device is mounted on the motor-incorporating type camera.

The above and other objects and features of the invention will become apparent from the following detailed description of an embodiment thereof taken in connection with the accompanying drawings.

BRIEF DESCRIPTION OF THE DRAWINGS

FIG. 3 is a longitudinal section showing a power transmission mechanism provided for transmitting power to a film rewinding transmission system and a shutter charging transmission system which are included in the mechanism shown in FIG. 2. FIGS. 25, 25(a) and 25(b) are diagrams showing in outline the electrical arrangement of the camera, the motor drive device and circuits provided on a lens. FIG. 26 is a time chart showing the sequence of operations of motors, etc. to be performed within the camera when the camera is used alone for photographing and when a low reduction ratio is selected with the motor drive device mounted on the camera. FIG. 27 is a time chart showing the sequence of operations of the motors, etc. to be performed when a high reduction ratio is selected with the motor drive device mounted on the camera. FIGS. 28 to 36 are flow charts showing the programs of operations to be executed with a microcomputer disposed within the camera.

DETAILED DESCRIPTION OF THE PREFERRED EMBODIMENT

Figure 1A:
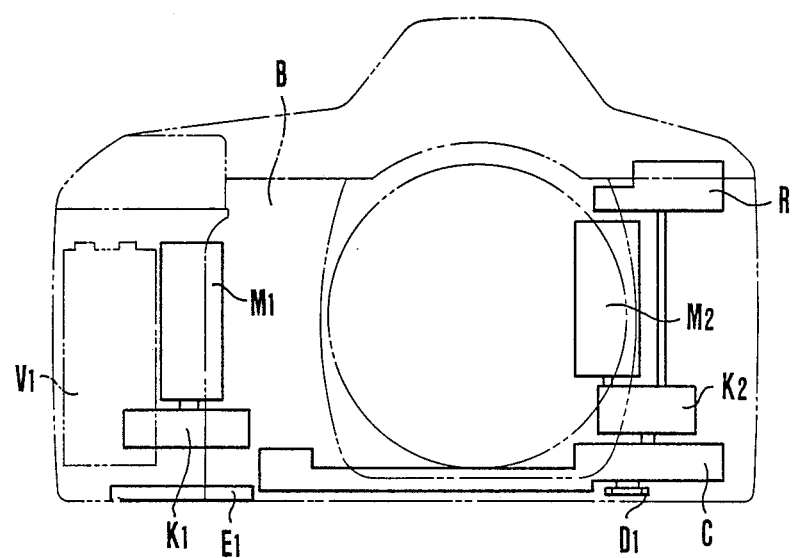
FIGS. 1(a) and 1(b) show in outline the arrangement of the power system of a camera system arranged as an embodiment of this invention.

In one aspect of the invention, a camera and a motor drive device are arranged as follows: A motor disposed within the camera and a motor disposed within the motor drive device share loads in an optimum manner in such a way as to prevent the motor and a power transmission mechanism disposed within the camera from becoming a load wholly imposed on the motor drive device. Loads of varied characteristics exist within the camera including a film winding system, a film rewinding system, a shutter charging system, etc.. In accordance with this invention, the motor of the camera and that of the motor drive device are arranged to be in such a relation to the loads that the loads of different characteristics are shared and borne separately by these motors. At the same time, power transmission mechanisms are designed to ensure efficient power transmission. As a result, a photographing system can be arranged to have almost no dead weight either when the camera is singly used or when it is used in combination with the motor drive device. Therefore, the system according to this invention is light in weight and efficient in power transmission.

In one aspect of the invention, a camera system is arranged on the following basic design concept:

(1) When a motor-incorporating type camera is used with a power drive device mounted thereon, loads are allocated to all the motors disposed within both the camera and the motor drive device to minimize the number of such parts of a power transmission mechanism that become idle within the camera. Each motor is combined with an applicable load to have it in the most rational relation. Meanwhile, the power transmission mechanism of the camera and that of the motor drive device are arranged to form most efficient power transmission systems. The sizes and weights of the camera and the motor drive device are thus reduced as much as possible.

In embodying the basic design concept, how to allocate loads to motors presents the most important question. To find an answer to this question, the inventors of the present invention have conducted the following studies on the relation of the varied loads to the motors:

Generally, among the various loads existing within the camera, the character of the film winding transmission system and that of the shutter charging transmission system differ from each other. Therefore, they must be driven by different motors. More specifically, the film winding load varies with ambient temperature as well as a difference between one film product and another. This load is of a relatively small magnitude. Meanwhile, the shutter charging load is larger and is not readily affected by variations in the ambient temperature. Besides, the shutter charging load often varies during one charging process. In the light of this difference, the shutter charging system theoretically must be driven by a motor of a larger capacity than the motor used for driving the film winding system.

However, the film winding mechanism is located away from the lens barrel of the camera and is in a position within the camera body to permit the use of a larger space for the film winding motor. Hence, a large motor capable of producing a large output can be used for film winding. Whereas, the shutter charging mechanism is disposed close to the lens barrel to permit use of a smaller space for the shutter charging motor. Hence, it is impossible to use a shutter charging motor of a large output.

Therefore, it is irrational to have the film winding mechanism driven by the motor disposed within the motor drive device when the device is mounted on the motor-incorporating type camera. The motor within the motor drive device is preferably used for driving the shutter charging mechanism. Since a motor capable of producing a large and ample output for the load can be used for film winding, the film winding speed can be easily increased, with the motor drive device mounted, by just raising a voltage applied to the motor.

The camera system embodying one aspect of the invention on the basis of the above-stated concept further includes a second basic design concept as follows:

(2) When the motor drive device is mounted on the camera, a high voltage is applied to the film winding motor disposed within the camera to cause it to feed the film at a higher speed than when the camera is used without the motor drive device. Meanwhile, the shutter charging transmission system is driven by a large output motor which is disposed within the motor drive device.

In the case of the specific embodiment of this invention described below, the film winding mechanism and the motor drive device are provided respectively with power transmission mechanisms which are arranged to permit selection between high and low speeds. Further, the camera is provided with a switching means which is arranged to switch one power transmission route over to another within the camera when the motor drive device is mounted. The details of the embodiment will become apparent from the following description:

The camera which is an essential part of the invented photographing (or camera) system is provided with means for selection between a high speed transmission system and a low speed transmission system which are included in the film winding transmission system. This selecting or switching means is arranged to be operated according to the result of detection of the voltage of a power supply to the film winding motor and according to whether the motor drive device is mounted on the camera.

Referring to the accompanying drawings, the camera system arranged as the embodiment of the invention comprises in combination a single-lens reflex camera which includes two motors and a first battery; and a motor drive device which includes one motor and a second battery.

Figure 1B:
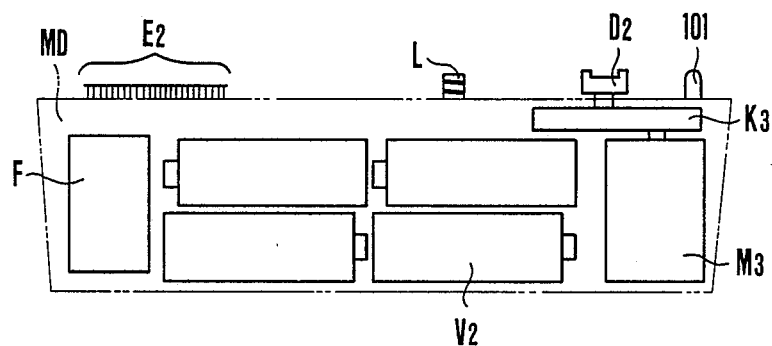

FIG. 1(a) shows in outline the arrangement of the motor-incorporating camera B which is a main part of the camera system. FIG. 1(b) shows in outline the arrangement of the motor drive device MD which is an accessory part of the camera system. Referring to FIGS. 1(a) and 1(b), these illustrations include the first battery V1 disposed within the camera B; a first motor M1 which is arranged to drive a film winding transmission mechanism K1 disposed within the camera B; and a second motor M2 which is arranged to drive a film rewinding transmission mechanism R and a shutter charging transmission mechanism C. A power transmission mechanism K2 includes a switching mechanism which switches one power transmission route over to another in such a way as to transmit the power generated by the motor M2 to the film rewinding transmission mechanism R and also to the shutter charging transmission mechanism C when the motor drive device MD is not mounted on the camera B and to transmit it only to the film rewinding transmission mechanism R when the motor drive device MD is mounted on the camera B. A coupler D1 is arranged to couple the power transmission mechanism of the motor drive device MD with that of the camera B when the motor drive device MD is mounted on the camera. An electrical connection terminal E1 is arranged to be connected to the electrical connection terminal E2 disposed on the side of the motor drive device MD.

Meanwhile, the motor drive device MD includes the above-stated second battery V2; a third motor M3; a power transmission mechanism K3 which is connected to the motor M3; a coupler D2 which is connected to the power transmission mechanism K3 and is arranged to be coupled with the above-stated coupler D1; an electrical connection terminal E2 which is arranged to be connected to the electrical connection terminal E1 of the camera B; an electronic circuit F including a motor control circuit which is arranged to control the motor M3 and an information exchange circuit which is arranged to exchange signals with an electronic circuit disposed inside the camera B; and a mounting screw L which is to be screwed into a screw hole provided in the bottom side of the camera B.

Figure 2:
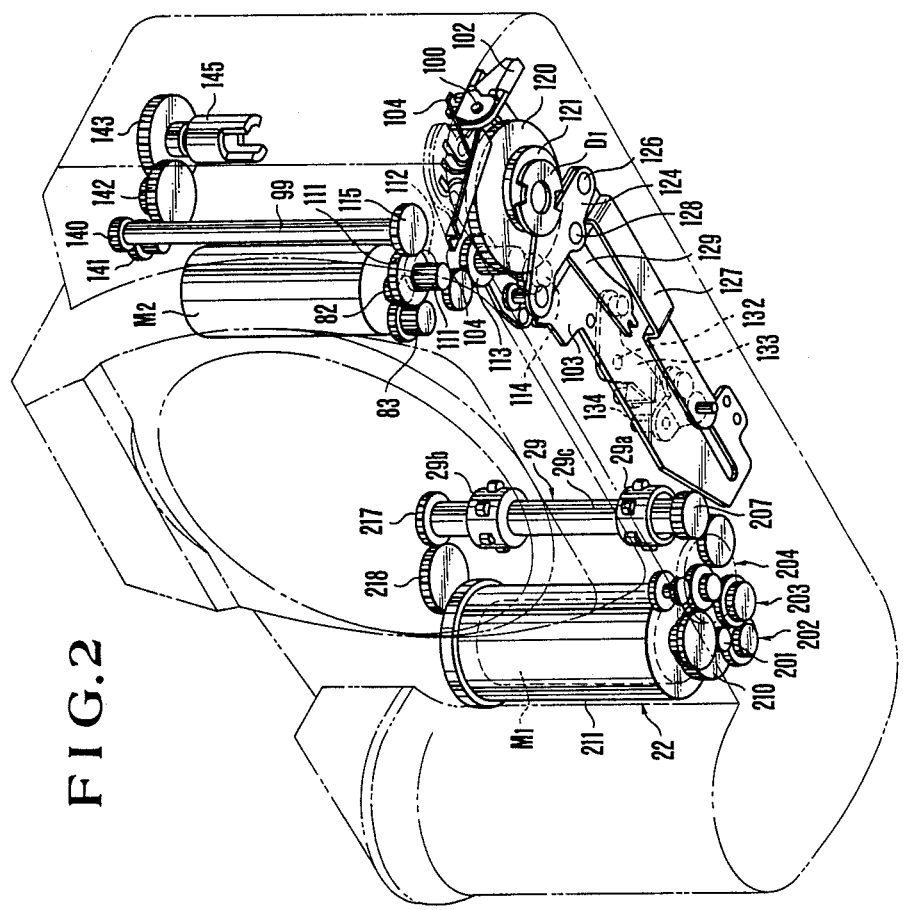
FIG. 2 is an oblique view showing the internal mechanism of the camera system of this invention as viewed from below on the front side thereof.
Figure 4A:
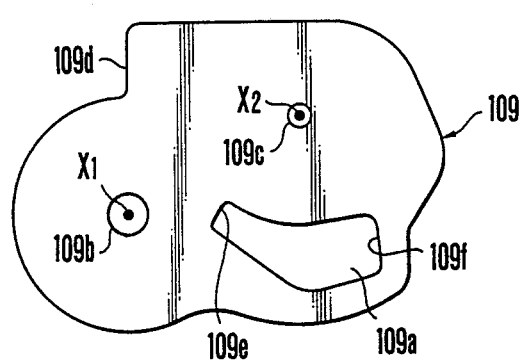
FIGS. 4 (a) to 4(c) are plan views showing a planetary gear mechanism and related members.
Figure 4B:
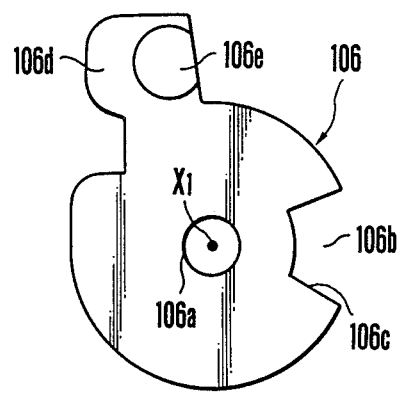
Figure 4C:
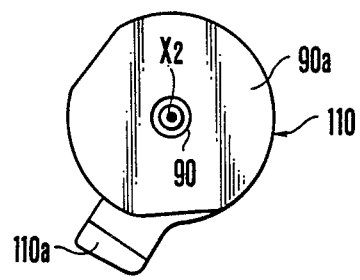
Figure 5:
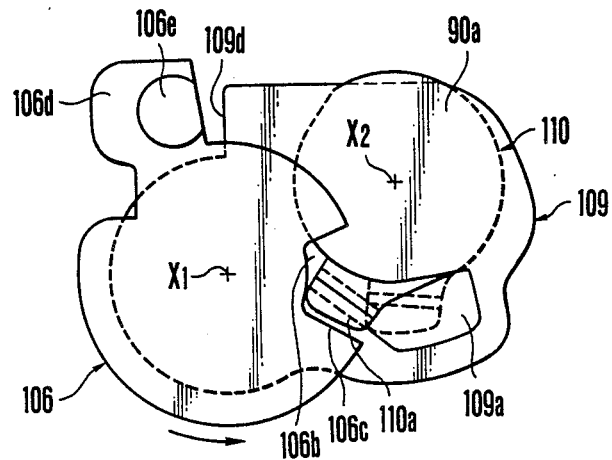
FIG. 5 is a plan view showing the positional relation obtained under a specific condition among the members shown in FIGS. 4(a), 4(b) and 4(c).
Figure 7:
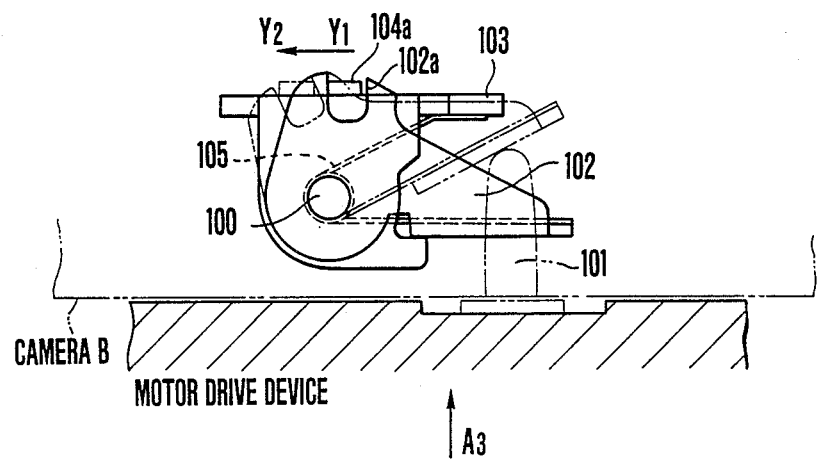
FIG. 7 is a side view showing members which are included in the power transmission mechanism of FIG. 3 and are arranged to act in response to a motor-drive-device mounting action on the camera.

Next, the details of the internal mechanical arrangement of the camera B are described below with reference to FIGS. 2 to 21:

FIG. 2 is an oblique view showing the internal mechanisms of the camera B related to the invention as viewed from below. FIG. 3 is a sectional view showing the power transmission mechanism K2 which is included in the mechanisms shown in FIG. 2 and is mechanically connected to the second motor M2 along with a part of the shutter charging transmission mechanism C. FIGS. 4(a) to 4(c) are plan views showing main component members of the power transmission route switching mechanism which is included in the power transmission mechanism K2 connected to the motor M2. FIG. 5 is a plan view showing these component members as in a specific state obtained in their relative motions. FIG. 7 shows a responding member which is arranged to act in response to a motor-drive-device mounting action on the camera B, the responding member being shown in relation to a power transmission route switching member which acts in association with the responding member (or a mounting-responsive member).

The internal mechanisms of the camera B will be first described in outline with reference to FIG. 2. After that, the arrangement of the power transmission mechanism K2 will be described with reference to FIGS. 2 and 3 to 11.

Outline of Mechanical Arrangement within the Camera:

Referring to FIG. 2, the illustration includes a spool assembly 22 including a film winding spool 211 which contains the motor M1 therein; a sprocket assembly 29 which is provided for a film feeding purpose; a pinion 201 which is secured to the shaft of the motor M1; a group of gears 202 to 210 jointly forming a gear mechanism which is arranged to transmit the power of the motor M1 to a gear 207 secured to the shaft 29c of the sprocket 29; a pinion 82 which is secured to the shaft of the motor M2; a stepped gear 83 consisting of a large gear 83a (See FIG. 3) which engages the pinion 82 and a small gear 83b (See FIG. 3) which engages the large gear 111a of a sun gear 111; the sun gear 111 which is arranged to form a planetary gear mechanism and to be driven by the gear 83; a planet gear 112 which engages the small gear 111b of the sun gear 111; intermediate gears 113 and 114 which are arranged to transmit the rotation of the planet gear 112 to a shutter charging gear 120; a mounting-responsive lever 102 which is arranged to swing in response to a mounting action performed on the motor drive device MD to mount it on the camera B; a power transmission route switching member 104 which is arranged to be driven by the mounting-responsive lever 102; a fork 145 for film rewinding; a fork gear 143 which is secured to the fork 145; and gears 140 to 142 which are arranged to transmit rotation to the fork gear 143.

Further, in FIG. 2, reference numerals 120 to 134 denote members forming the shutter charging transmission mechanism C. The shutter charging transmission mechanism C is arranged as will be described later with reference to FIGS. 2, 12 and 13.

Figure 8:
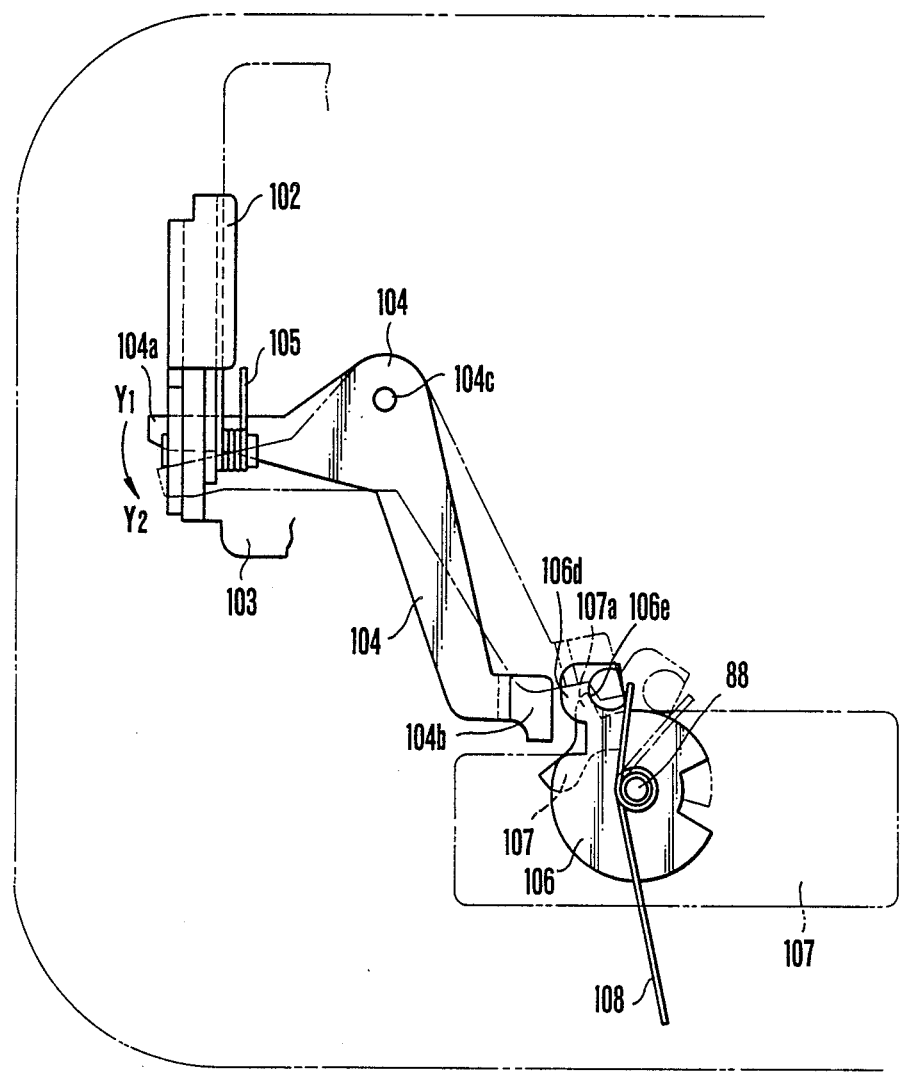
FIG. 8 shows the same members as viewed in the direction of arrow A3 shown in FIG. 7.

Arrangement of Power Transmission Mechanism K2:

The power transmission mechanism K2 includes power transmission route switching means. The switching means is arranged to allow a driving force either to the shutter charging transmission mechanism C or to the film rewinding transmission mechanism according to the rotating direction of the motor M2 and also to act to connect the shutter charging transmission mechanism C to the power transmission mechanism disposed within the motor drive device MD when the motor drive device MD is mounted on the camera. This switching means is mechanically composed of a planetary gear mechanism and various members related to the planetary mechanism as described below:

FIG. 3 shows a motor mount 81 to which the motor M2 is secured; an intermediate base plate 84 which is coupled with the main base plate 103 of the camera through a member which is not shown; a fixed shaft 81a which protrudes from the motor mount 81 to rotatably carry the gear 83; a fixed shaft 95 which is secured to the intermediate base plate 84 and is arranged to rotatably carry the sun gear 111 of the planetary gear mechanism; a sleeve member 86 which is rotatably fitted on the fixed shaft 95 and is also attached to the su gear 111 to carry the sun gear 111 in such a way as to allow it to rotate around the fixed shaft 95; a spring 87 which is arranged to push one end of the sun gear 111 against the flanged end face of the sleeve member 86 and to push the end face of the sleeve member 86 toward the surface of a stepped shaft 88; a planet arm 109 which is in a flat shape as shown in FIG. 4(a) and is secured to the sleeve member 86, the arm 109 being arranged to be rotatable on a fixed shaft 95; a planet shaft 89 which is secured to the planet arm 109; a sleeve member 90 which is rotatably fitted on the planet shaft 89 and has the planet gear 112 rotatably fitted thereon to be rotatable relative thereto; a spring 91 which is interposed in between a spring stop 97 secured to the fore end of the sleeve member 90 and the planet gear 112 and is arranged to strongly push the planet gear 112 toward the flange part 90a of the sleeve member 90. A retainer 98 which is arranged to prevent the sleeve member 90 from pulling off the planet shaft 89; a stepped shaft 88 which is nonrotatably fitted on the fore end of the fixed shaft 95; a spring 108 which is fitted on the stepped shaft 88 and is arranged to give a torque to an escape member 106 urging the latter to turn around the stepped shaft 88 in a given direction; the escape member 106 which is in a flat shape as shown in FIG. 4(b) and is loosely fitted on the large diameter part of the stepped shaft 88 to be rotatable on the shaft 88; a keep plate 107 which is secured to a structural member (not shown) and is loosely fitted on an intermediate diameter part of the stepped shaft 88 to prevent the shaft 88 from coming off the fixed shaft 95 and is provided with a protruding part 107a for stopping the escape member 106 as shown in FIG. 8; a planet gear stopper 110 which has its annular main part secured to the sleeve member 90 and a protruding part 110a arranged to enter a recess provided in the escape member 106 through a window provided in the planet arm 109 (see FIGS. 4(a) to 4(c)); an auxiliary base plate 119 which is mounted on a structural member (not shown); a tubular bearing member 96 which is fitted into a hole of the auxiliary base plate 119; a gear 113 is rotatably carried by the bearing member 96 and is arranged to engage the planet gear 112; a shaft 92 which is arranged to protrude from the auxiliary base plate 119; a gear 114 which is rotatably fitted on the shaft 92 and is prevented from pulling off the shaft 92 by a retainer 94; and a shutter charging gear 120 which is rotatably fitted along with the coupler D1 on a shaft 146 secured to the auxiliary base plate 119. The shutter charging gear 120 constantly engages the gear 114. Further, as shown in FIG. 3, the power transmission route switching member 104 which is shown also in FIG. 2 is rotatably fitted on a shaft 93 which is secured to the main base plate 103. One end of the member 104 engages the mounting-responsive lever 102 as will be described later with reference to FIGS. 7 and 8.

A gear 115 is secured to a shaft 99 which is arranged to transmit a power to the film rewinding transmission mechanism R. The gear 115 is capable of engaging the planet gear 112 on the planet arm 109 when the arm 109 is moved to a position indicated by a two-dot-chain line in FIG. 3.

The sun gear 111 which is caused by the pressure of a spring 87 to frictionally engage the planet arm 109 via the sleeve member 86 has a large gear part 111a engaging the gear 83 and a small gear part 111b engaging the planet gear 112. When the torque of the load transmitted from the planet gear 112 is larger than the friction torque between the sleeve member 86 and the sun gear 111, the sun gear 111 becomes independently rotatable relative to the planet arm 109.

The planet gear 112 also frictionally engages the sleeve member 90, like the sun gear 111, by being pressed against a flange part 90a of the sleeve member 90 by the pressure of a spring 91. Therefore, when a load torque applied to the planet gear 112 comes to exceed a friction torque between the sleeve member 90 and the planet gear 112, the planet gear 112 becomes independently rotatable relative to the sleeve member 90.

Figure 6:
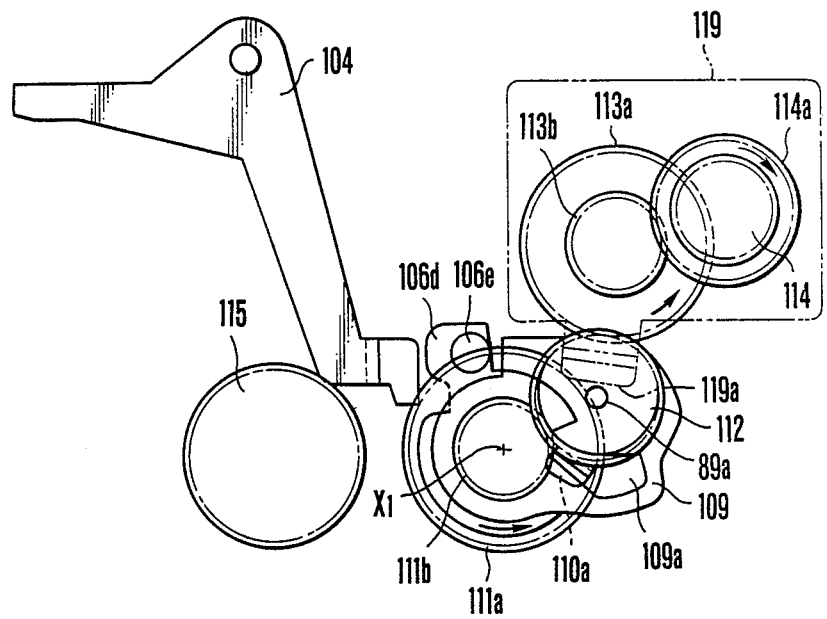
FIG. 6 is a plan view showing a specific state of the planetary gear mechanism and related members included in the power transmission mechanism shown in FIG. 3.

The end part 89a of a rotating shaft 89 which is carrying the planet gear 112 engages an up-bent part 119a protruding from an edge part of the auxiliary base plate 119 under the condition shown in FIGS. 3 and 6. The up-bent part 119a prevents the swinging movement in one direction of the planet arm 109.

The gear 113 which is arranged to engage the planet gear 112 and the gear 114 is in the form of a gear shaft and has a large gear part 113a which engages the planet gear 112 and a small gear part 113b which engages the large gear part 114a of the gear 114.

The gear 114 which is in a double-gear form has a small gear part 114b formed in one body with the above-stated large gear part 114a.

Next, the shapes, arrangement and actions of the planet arm 109, the escape member 106 and the planet gear stopper 110 are described with reference to FIGS. 4(a), 4(b), 4(c), 5 and 6. The relation between the power transmission route switching member 104 and the mounting-responsive lever 102 is described with reference to FIGS. 7 and 8.

The planet arm 109 of the planet gear mechanism is in a flat shape as shown in FIG. 4(a). The flat planet arm 109 has a hole 109b in which the sleeve member 86 (FIG. 3) is inserted; a hole 109c in which the planet shaft 89 (FIG. 3) is inserted; a window 109a in which the protruding part 110a of the planet gear stopper 110 is inserted; and a stepped part 109d which is formed in a peripheral edge part of the arm 109. The planet arm 109 is rotatable on the axis X1 of the hole 109b along with the sleeve member 86. The planet gear 112 which is carried by the planet arm 109, constantly engages the small gear 111b of the sun gear 111 which is fitted on the sleeve member 86. The planet gear 112 is thus arranged to revolve around the sun gear 111 together with the planet arm 109 and to be also capable of rotating on the axis X2 of the planet shaft 89.

The escape member 106 which is disposed below the planet arm 109 as shown in FIG. 3 is in a flat shape as shown in FIG. 4(b). Referring to FIG. 4(b), the escape member 106 has a hole 106a which is fitted on a stepped shaft 88 as shown in FIG. 3; a recess 106b formed in a peripheral edge portion of a disc-shaped main part; a protruding part 106d which protrudes from the periphery of the main part; and a projection 106e which protrudes from the protruding part 106d perpendicularly to the paper surface of FIG. 4(b). The escape member 106 is rotatable on the axis X1 (the rotation axis of the planet arm 109) of the fixed shaft 95 (FIG. 3) together with the stepped shaft 88 which is fitted into the hole 106a. Further, the projection 106e is arranged to engage the stepped peripheral part 109d of the planet arm 109 while the protruding part 106d is arranged to engage the power transmission route switching member 104.

The sleeve member 90 which is rotatably fitted on the planet shaft 89 (FIG. 3) has a flange part 90a. On the flange part 90a is mounted the planet gear stopper 110 which is arranged as shown in FIG. 4(c) and FIG. 3. The planet gear stopper 110 consists of a main part which is secured to the flange part 90a of the sleeve member 90; and a protruding part 110a which is arranged to protrude to the outside of the flange part 90a and to enter the recess 106b of the escape member 106 through the window 109a of the planet arm 109. The stopper 110 is rotatable on the axis X2 of the planet shaft 89.

When the planet gear 112 is engaging the large gear part 113a of the gear 113 as shown with a full line in FIG. 3, the power generated by the motor M2 is transmitted via the gear 114 to the shutter charging gear 120. Under this condition, the planet arm 109, the escape member 106 and the planet gear stopper 110 are in their relative positions as shown in FIGS. 5 and 6. FIG. 5 shows their positions as viewed in the direction of arrow A1 of FIG. 3. FIG. 6 shows a positional relation obtained among the planet arm 109, the escape member 106, the planet gear stopper 110, the power transmission route switching member 104 and the auxiliary base plate 119 under the condition of FIG. 5. Further, the power transmission mechanism K2 transmits the power to the shutter charging transmission mechanism C when the motor M2 is rotated forward and to the film rewinding transmission mechanism R when the motor M2 is reversely rotated. In other words, in the latter case, the planet gear 112 is disengaged from the gear 113 to have the planet gear 112 engage the gear 115. The power transmission is thus automatically switched from one route over to the other.

When the planet gear 112 is engaging the large gear part 113a of the gear 113 as shown in FIGS. 3 and 6, the motor M2 forwardly rotates to apply a torque to the planet arm 109 urging the arm 109 to turn counterclockwise on the axis X1 of the sun gear 111 as shown in FIGS. 5 and 6. Under this condition, therefore, the planet gear 112 on the planet arm 109 is pushed toward the circumferential face of the gear 113a to have these gears 112 and 113a engage each other. In this instance, before the planet gear 112 comes to engage the gear 113a with the the planet gear 112 reaching its position for engaging the gear 113a as shown in FIGS. 5 and 6, the fore end 89a of the planet shaft 89 which is protruding from the planet arm 109 comes to impinge upon the protruding part 119a of the auxiliary base plate 119 to bring the turning movement of the planet arm 109 to a stop. After the planet arm 109 is thus brought to a stop, the rotation torque of the sun gear 111 is converted into the rotation torque of the planet gear 112. In other words, the load on the planet gear 112 increases. This causes a slip between the sleeve member 90 and the planet shaft 89. A slip takes place also between the sleeve member 86 and the sun gear 111. As a result, the planet gear 112 and the sleeve member 90 begin to rotate clockwise as viewed on FIG. 6. Then, the protruding part 110a of the planet gear stopper 110 which is in one unified body with the sleeve member 90 moves within the window 109a of the planet arm 109 from its position indicated with the two-dot-chain line in FIG. 5 to its position indicated with a full line. The protruding part 110a thus enters a narrow part of the window 109a and then comes to abut on the end edge 109e of the narrow part (FIG. 4(a)). This stops the stopper 110 and the sleeve member 90 from rotating. Then, the planet gear 112 comes to rotate on the sleeve member 90.

Meanwhile, when the planet arm 109 stops turning, the escape member 106 is in its position as shown in FIG. 5. The escape member 106 thus has the protruding part 110a located within its recess 106b. Therefore, even when a force is exerted to move the gear 113a away from the planet gear 112 while they are engaging each other, the protruding part 110a of the planet gear stopper 110 is prevented from moving counterclockwise by the wall face 106c of the recess 106b because of the counterclockwise torque which is applied to the escape member 106 to urge it to turn on the axis X1 as shown in FIGS. 5 and 6. As a result, the planet gear 112 and the gear 113a are stably kept in a state of engaging each other under the condition of FIG. 6.

Next, referring to FIGS. 2, 7 and 8, the interlocked arrangement of the mounting-responsive lever 102, the power transmission route switching member 104 and the above-stated escape member 106 is as described below:

As shown in FIGS. 2 and 7, the mounting-responsive lever 102 is mounted on the main base plate 103 to be rotatable on a horizontal pin 100 as shown in FIGS. 2 and 7. A spring 105 urges the lever 102 to be normally in parallel with the bottom surface of the camera B as shown in FIGS. 7 and 8. A groove 102a is formed in the upper edge of the base part of the lever 102 as shown in FIG. 7. An end part 104a of the power transmission route switching member 104 is inserted in the groove 102a. The switching member 104 is formed in a lever-like shape and is attached to the main base plate 103 in such a way as to turn within a horizontal plane on a vertical pin 104c as shown in FIGS. 2, 6 and 8. One end part 104a of the member 104 constantly engages the mounting-responsive lever 102 as mentioned in the foregoing. The other end part 104b is disposed close to a position at which it can be engaged with the protruding part 106d of the escape member 106.

The stepped shaft 88 on which the escape member 106 is rotatably fitted has a spring 108 fitted thereon. The spring 108 urges the escape member 106 to turn counterclockwise as viewed on FIG. 8. When the end part 104b of the switching member 104 is in its position indicated with a full line in FIG. 8, the escape member 106 is kept in a state of having its projection 106e pushed by the spring 108 against the protruding part 107a of the keep plate 107 as indicated with a full line in FIG. 8. When the escape member 106 and the power transmission route switching member 104 are in the state indicated with the full lines in FIG. 8, the planet gear 112 is allowed to engage either the gear 113a as shown in FIG. 6 or the gear 115 as will be described later on.

When the motor drive device MD is mounted on the camera B, the pin 101 which is provided on the motor drive device MD pushes the mounting-responsive lever 102 toward the inside of the camera as shown in FIG. 7. The lever 102 is thus turned counterclockwise on the pivot pin 100. One end 104a of the power transmission route switching member 104 which is carried by the groove 102a of the lever 102 is moved from the full line position Y1 of FIGS. 7 and 8 to the two-dot-chain line position Y2. Therefore, the switching member 104 turns counterclockwise around a pin 104c to take its position indicated with a two-dot-chain line in FIG. 8. The other end 104b of the member 104 then pushes the protruding part 106d of the escape member 106. This causes the escape member 106 to turn clockwise on the shaft 88. As a result, the planet gear 112 and the gear 113 are disengaged from each other.

The power transmission mechanism K2 engages the planet gear 112 with the gear 113a when the motor M2 is allowed to rotate forward and engages the planet gear 112 with the gear 115 when the motor M2 reversely rotates.

FIG. 6 shows the engaging state of gears brought about by the forward rotation of the motor M2 (causing the sun gear 111 to rotate counterclockwise as viewed on FIG. 6) when the camera B is used alone without having the motor drive device MD mounted thereon. When the motor M2 is caused to rotate forward with the camera used alone, the planet gear 112 engages the gear 113a to transmit the power of the motor M2 to the shutter charging gear 120. This performs a shutter charging action. With the planet gear 112 allowed to engage the gear 113a as shown in FIG. 6, the positions of the planet arm 109, the planet gear stopper 110 and the escape member 106 relative to each other are as shown in FIG. 5. Under this condition, the protruding part 110a of the planet gear stopper 110 is abutting on the left inside edge of the window 109a of the planet arm 109 within the window 109a. In other words, the protruding part 110a is in repose in a position as indicated with a full line in FIG. 5.

The protruding end 89a of the planet shaft 89 which protrudes from the planet arm 109 is then abutting on the protruding part 119a of the auxiliary base plate 119 as shown in FIG. 6 and thus prevents the clockwise turning movement of the planet arm 109. Further, under the condition as shown in FIGS. 5 and 6, if the planet gear 112 receives a force in the direction of disengaging it from the gear 113a due to fluctuations in the charging load torque, etc., for example, while the power of the motor M2 is being transmitted to the shutter charging transmission mechanism C, the protruding part 110a of the planet gear stopper 110 which is located within the recess 106b of the escape member 106 is urged to turn counterclockwise on the axis X2 shown in FIG. 5. However, the edge part 106c of the recess 106b prevents the protruding part 110a from turning counterclockwise. Therefore, the protruding part 110a is restricted to the left end position within the window 109a of the planet arm 109. The planet arm 109 is thus prevented from turning even when a clockwise turning force is applied from the planet gear 112 to urge the arm 109 to turn clockwise on the axis X1 as viewed on FIG. 5. The planet gear 112 is thus kept in a state of engaging the gear 113a.

Figure 9:
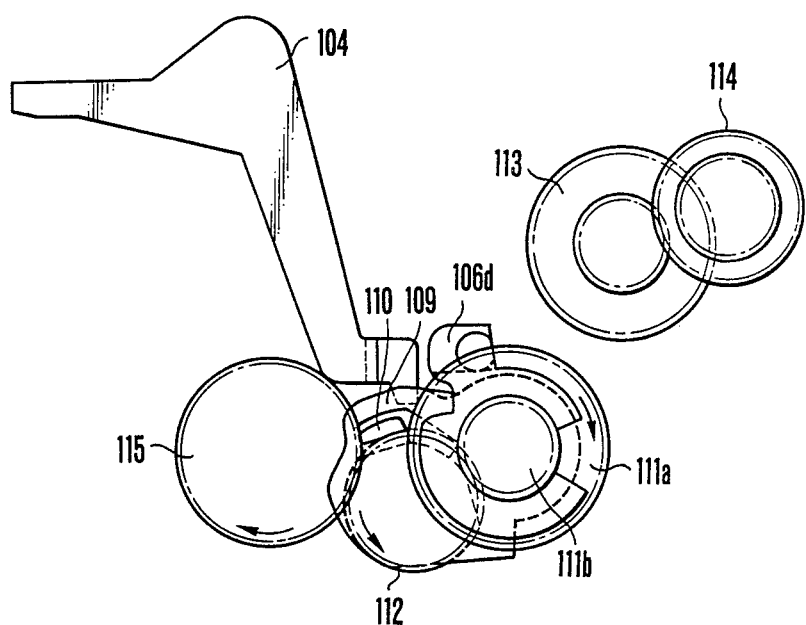
FIGS. 9 to 11 show the mechanism of FIG. 6 as in different states.

FIG. 9 shows the planet gear mechanism as in a film rewinding state obtained with the motor M2 reversely rotated (to rotate the sun gear 111 clockwise) when the camera is used alone. In the state of FIG. 9, the planet gear 112 engages the gear 115 of the film rewinding system. The protruding part 110a of the planet gear stopper 110 is then located in the right end position within the window 109a of the planet arm 109 as viewed on FIG. 5.

Figure 10:
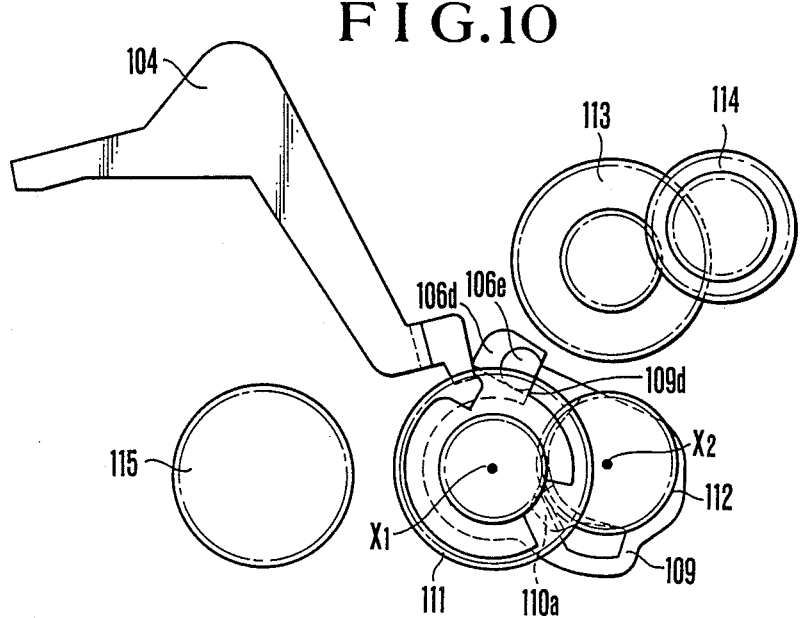

FIG. 10 shows the planet gear mechanism as in a shutter charging state obtained with the motor drive device MD mounted on the camera B. In this case, the motor-drive-device mounting action causes the power transmission route switching member 104 to turn clockwise on the axis X1 of the escape member 106 as shown in FIG. 10. This releases the protruding part 110a of the planet gear stopper 110 from its restricted state. The sun gear 111 and the planet arm 109 are then turned in the same direction as the escape member 106. The planet gear 112 is disengaged from the gear 113a. The coupler D2 of the motor drive device MD then engages the coupler D1 which is arranged in one unified body with the shutter charging gear 120. As a result, the shutter charging transmission mechanism C is connected to the power transmission mechanism K3 which is disposed within the motor drive device MD. When a photographing operation is performed in this condition, the shutter charging transmission mechanism C is driven by the motor M3 which is disposed within the motor drive device MD.

Figure 11:
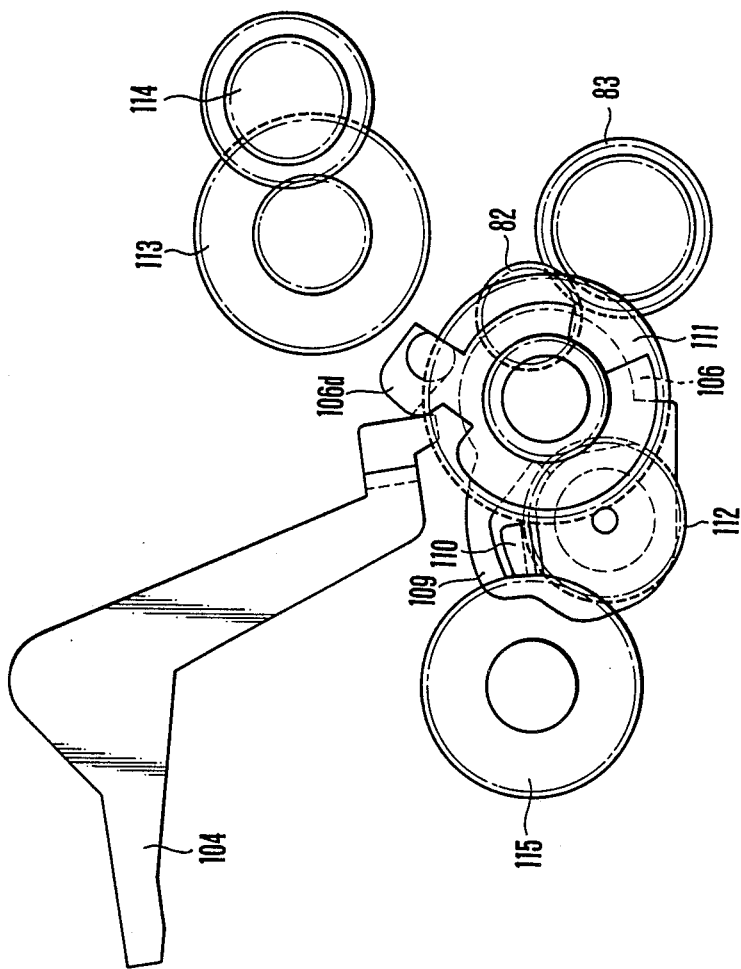

FIG. 11 shows the power transmission mechanism K2 as in a state obtained when film is rewound with the motor drive device MD mounted on the camera B. When the motor M2 is reversely rotated prior to the start of film rewinding, the sun gear 111 is rotated clockwise on the axis X1 as viewed in FIG. 10. Following this, the planet arm 109 is rotated clockwise on the axis X1 from its position shown in FIG. 10. As a result, the planet gear 112 revolves clockwise on the axis S1 until it comes to engage the gear 115 which is included in the film rewinding system. With the planet gear 112 having engaged the gear 115, a load torque acts on the planet gear 112. This causes the sleeve member 90 (see FIG. 3) to begin to rotate on the planet shaft 89. The planet gear 112 then begins to rotate counterclockwise on the axis X2 (FIG. 10) from its position shown in FIG. 10. The protruding part 110a of the planet gear stopper 110 which is unified with the sleeve member 90 turns counterclockwise within the window 109a of the planet arm 109 from its position shown in FIG. 10 until it comes to hit the right end edge 109f of the window 109a (see FIG. 4). The turning movement of the stopper 110 stops there. This brings the rotation of the sleeve member 90 to a stop. After that, the planet gear 112 rotates counterclockwise on the sleeve member 90 to transmit thereby the power generated by the motor M2 to the gear 115. As a result, a film rewinding action begins.

Figure 12:
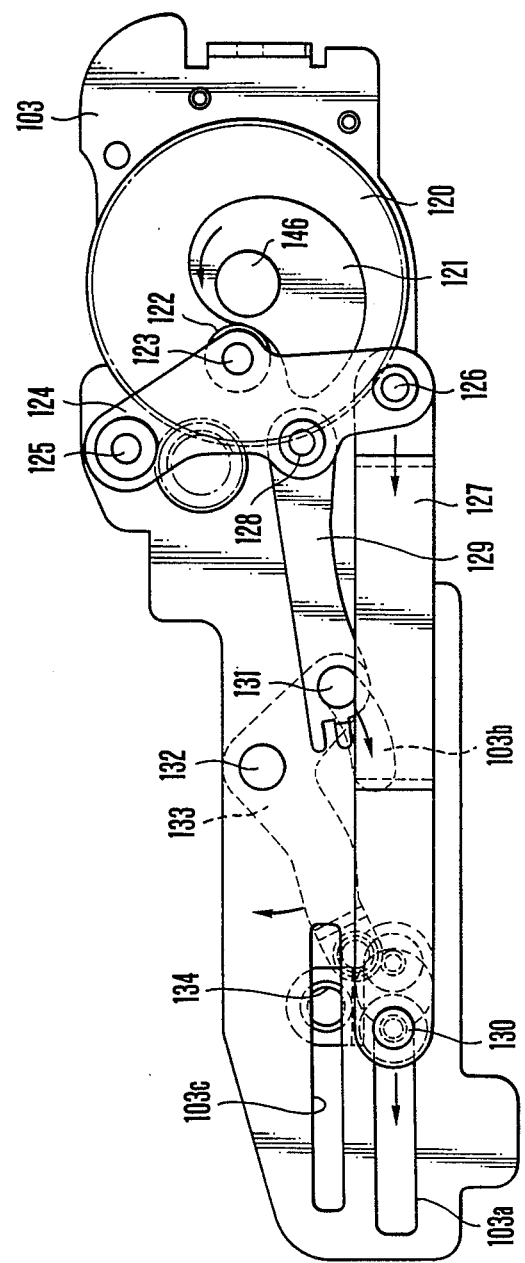
FIGS. 12 and 13 are plan views showing a shutter charging transmission system in two different states as viewed from below.
Figure 13:
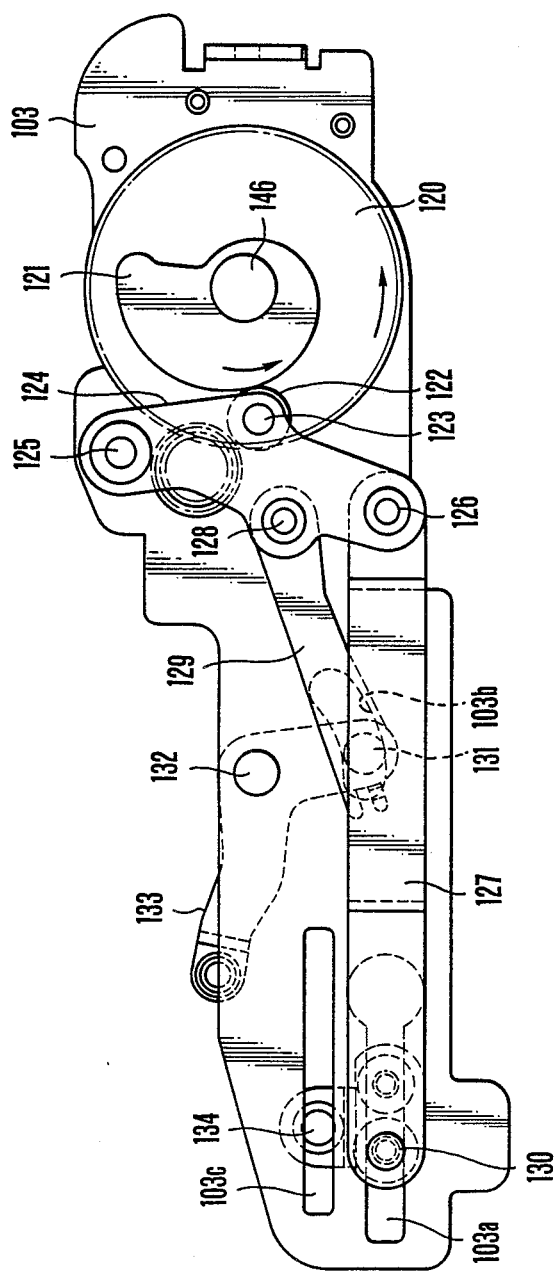

Structural Arrangement of Shutter Charging Transmission Mechanism C:

Referring to FIGS. 2, 12 and 13, the shutter charging transmission mechanism C is arranged as follows:

The shutter charging gear 120 engages a gear 114a as shown in FIG. 3. A plate cam 121 is secured to the gear 120. A lever-shaped cam follower 124 is swingably mounted on the main base plate 103 by means of a pin 125. A driven roller 122 engages the plate cam 121 and is rotatably carried by a shaft 123, which is mounted on the cam follower 124. A link lever 129 has one end thereof pivotally attached to the cam follower 124 and has a pin 131 protruding from the other end. A main charge lever 133 is pivotally attached to the main base plate 103 by means of a pin 132 and is also pivotally attached to the link lever 129 through the pin 131. A shutter charge lever 127 is arranged to have one end thereof pivotally attached to the cam follower 124 by means of a pin 126 and to have a pin 130 protruding from the other end. The shutter charge lever 127 includes a sidewise protruding part which is formed at the fore end of the lever 127. A pin 134 is arranged in the sidewise protruding part to be connected to a shutter mechanism which is not shown.

The main base plate 103 is provided with an arcuate guide slot 103b in which the pin 131 is slidably inserted; a straight guide slot 103a in which the pin 130 is slidably inserted; and another straight guide slot 103c in which the pin 134 is slidably inserted.

In the shutter charging transmission mechanism C which is arranged as described above, the plate cam 121 and the cam follower 124 are in a positional relation to each other as shown in FIG. 12 when no power is transmitted from the gear 114a to the gear 120. Under this condition, the pins 130, 131 and 134 are in repose respectively in the right end positions of the guide slots 103a, 103b and 103c. When the power transmission is effected from the gear 114a to the gear 120 to rotate it counterclockwise as viewed on FIG. 12, the plate cam 121 is rotated counterclockwise from its position of FIG. 12. The cam follower 124 then turns clockwise on the pin 125 accordingly as the degree of lift of the cam 121 increases. This moves the lever 127 and the link lever 129 to the left from their positions shown in FIG. 12. The pin 131 moves along the curved route of the guide slot 103b. The pins 130 and 134 straightly move along the guide slots 103a and 103c. The main charge lever 133 turns clockwise on the pin 132 accordingly as the pin 131 moves toward the left end of the guide slot 103b. The clockwise movement of the lever 133 charges a mirror-up mechanism which is not shown but connected to the left end of the lever 133. Further, a shutter mechanism which is not shown is also charged by the leftward movement of the pins 130 and 134 within the guide slots 103a and 103c.

FIG. 13 shows the position of each member obtained before the contact position of the driven roller 122 on the plate cam 121 reaches the maximum lift point of the cam 121. In this state, the shutter charging action is not completed.

Figure 14:
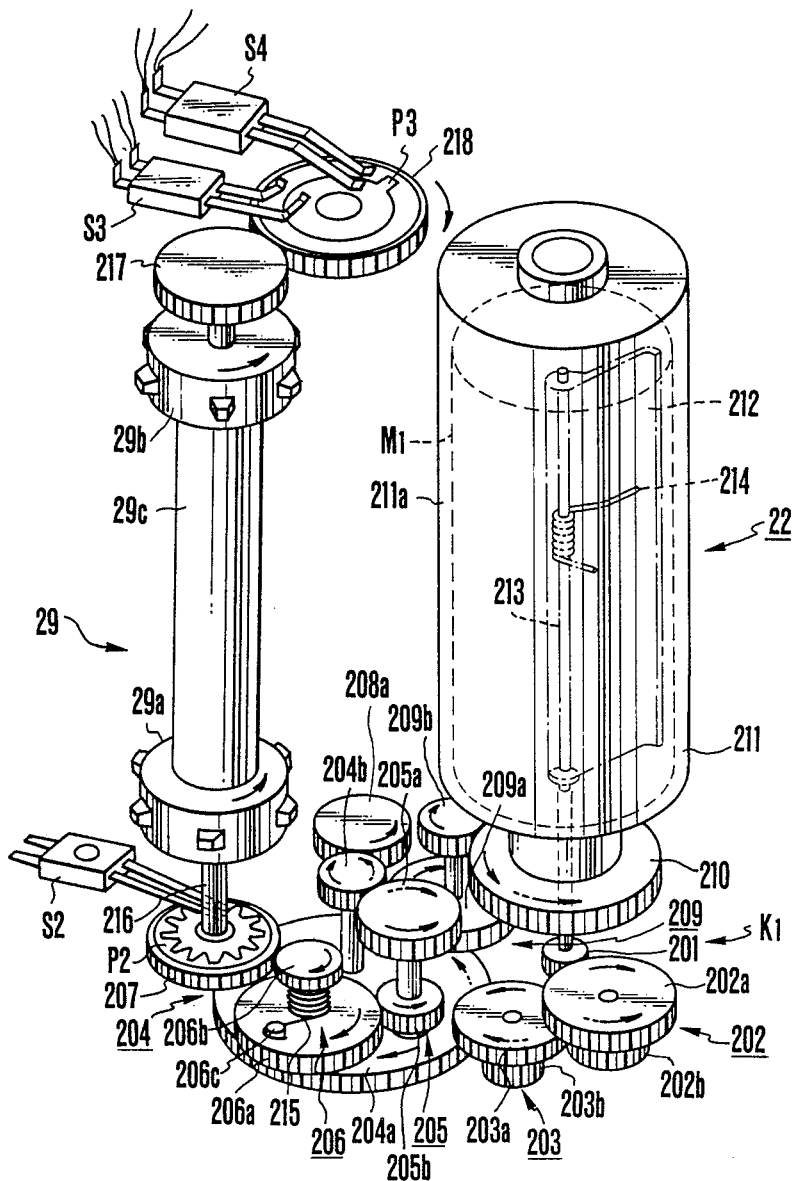
FIG. 14 is an oblique view showing in outline the arrangement of a film winding transmission system included in the mechanism shown in FIG. 2.
Figure 15:
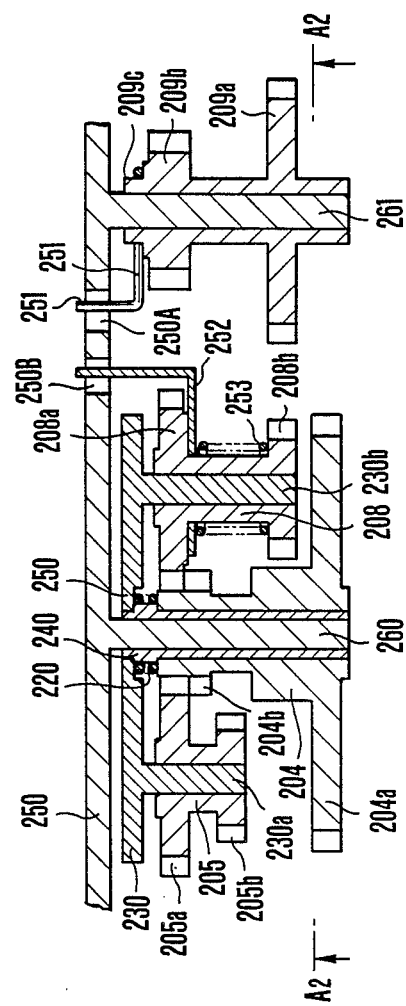
FIG. 15 is a longitudinal section showing a planetary gear mechanism included in the film winding transmission system shown in FIG. 14.
Figure 16A:
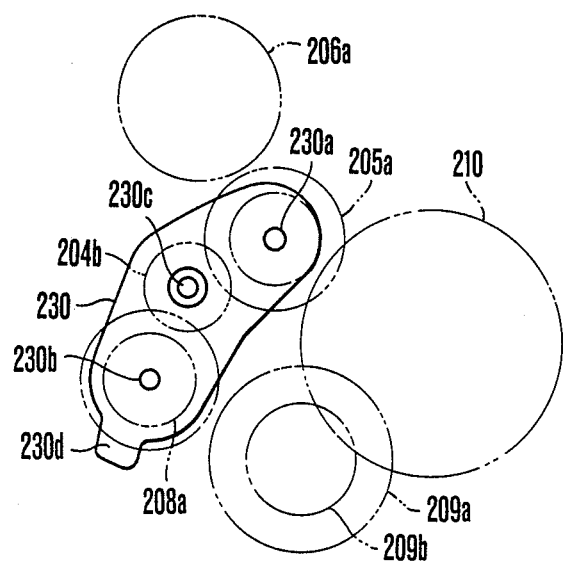
FIGS. 16(a) and 16(b) are exploded plan views of the mechanism of FIG. 15 taken in the direction of arrow A2 of FIG. 15.
Figure 16B:
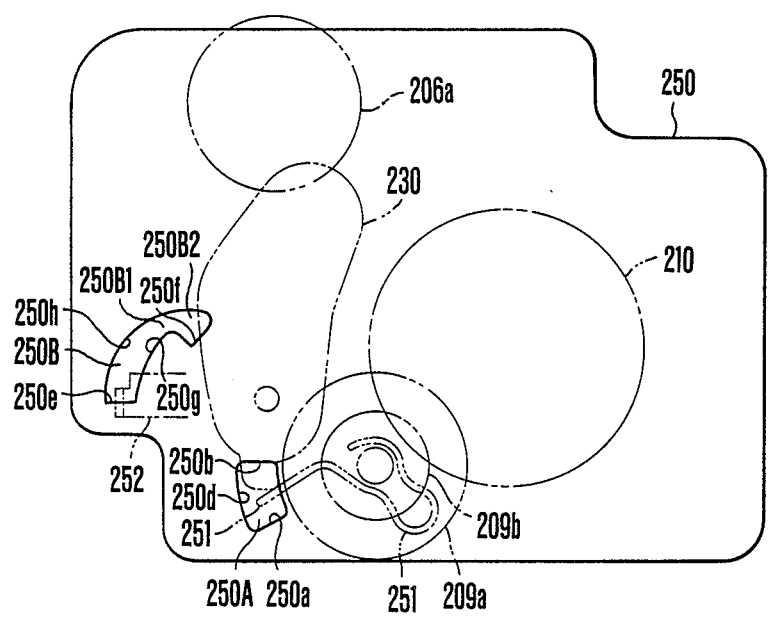
Figure 17:
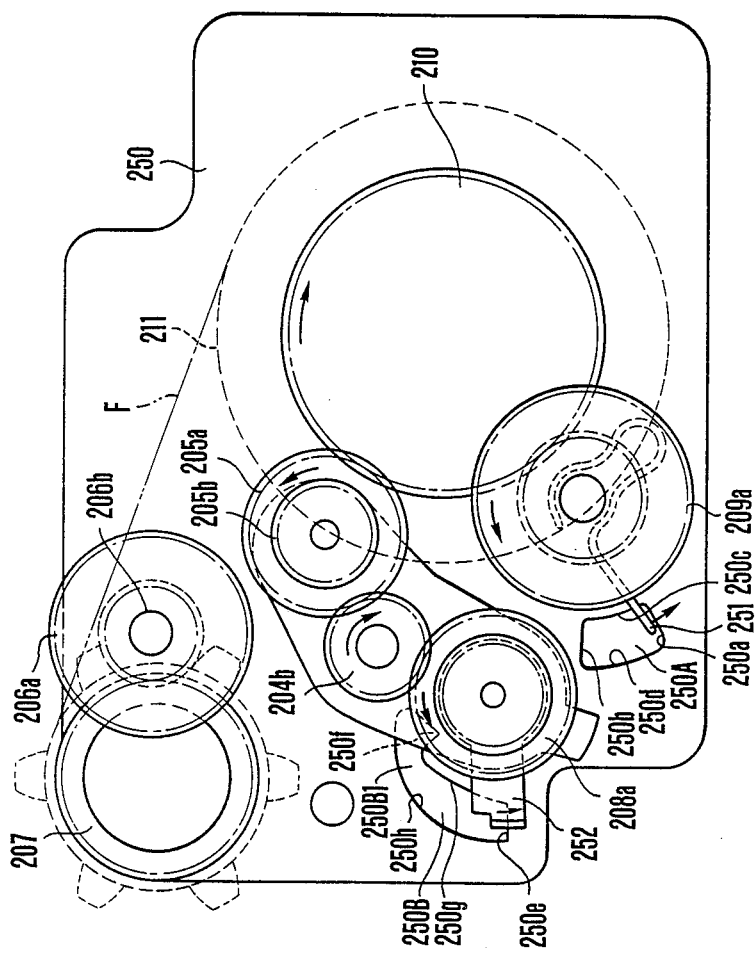
FIGS. 17 to 20 show the mechanism of FIGS. 14 and 15 as in varied states.

Structural Arrangement of Film Winding Transmission Mechanism K1:

Referring to FIGS. 14 to 21, the film winding transmission mechanism K1 is arranged as follows: FIG. 14 shows in an oblique view the members related to the mechanism K1. FIG. 15 is a longitudinal sectional view showing the essential parts of the mechanism K1. FIGS. 16(a), 16(b) and 17 are plan views of the arrangement of FIG. 15 taken on line A2—A2 in the direction of arrow.

The film winding transmission mechanism K1 includes a high-speed transmission system which is arranged to have a spool 211 rotated at a high speed and a low-speed transmission system which is arranged to have the spool 211 rotated at a low speed. The mechanism K1 further includes transmission system switching means for selecting the route of transmission from the motor M1 to the spool 211 by switching the use of the high-speed transmission system over to the low-speed transmission system and vice versa. More specifically, the planet gear mechanism and the related members which are mechanical component parts of the transmission system switching means are included in the film winding transmission mechanism K1. The transmission system switching means operates according to the rotating direction of the motor M1. The rotating direction of the motor M1 is determined according to whether or not the motor drive device MD is mounted on the camera B. Control over the start and rotating direction of the motor M1 will be described later in the description of electrical arrangement and operation.

Referring to FIG. 14, the illustration includes the above-stated spool assembly 22; the motor M1 which is disposed within a spool 211; and a pinion 201 which is secured to the shaft of the motor M1. The pinion 201 engages a gear 202 which is a double gear consisting of a large gear 202a and a small gear 202b. The gear 202 is rotatably carried by a structural member which is not shown. The large gear 202a engages the pinion 201.

A double gear 203 consists of a large gear 203a and a small gear 203b and is rotatably carried also by a structural member which is not shown. The large gear 203a engages the small gear 202b of the gear 202. A gear 204 is a double gear consisting of a large gear 204a and a small gear 204b and is rotatably carried by a structural member which is not shown. The large gear 204a engages the small gear 203b. The small gear 204b of the gear 204 is arranged to act as a sun gear of a planetary gear mechanism which includes a large gear part 205a of a gear 205 and a large gear part 208a of a gear 208. These large gears 205a and 208a are arranged to engage the gear 204b and act as planet gears.

FIG. 15 shows in a longitudinal section the planetary gear mechanism including the gear 204b as the sun gear and the gears 205a and 208a as planet gears. Members related to this planetary mechanism are also shown in FIG. 15. FIGS. 16(a) and 16(b) are plan views of the arrangement of FIG. 15 taken on line A2—A2 in the direction of arrow as indicated in FIG. 15. The plan view is partly exploded to show the shapes and relative positions of various members.

Referring to FIGS. 15, 16(a) and 16(b), the film winding transmission mechanism K1 shown in FIG. 14 is mounted on a film winding base plate 250. The winding base plate 250 has two shafts 260 and 261 secured thereto and protrude in one unified body with the base plate 250 as shown in FIG. 15. The winding base plate 250 is provided with two slots or hole parts 250A and 250B for controlling planet lever stop position as shown in FIGS. 16(a) and 16(b). A stepped sleeve-like bearing member 240 having two bearing faces on the periphery thereof is fitted on the above-stated shaft 260. To one of the bearing faces of the bearing member 240 is secured a planet lever 230, which carries the pair of planet gears. The above-stated gear 204 is rotatably fitted on the other bearing face of the bearing member 240. Further, between the bearing faces on which the planet lever 230 and the gear 204 are fitted, a spring 220 is fitted on the periphery of the bearing member 240. The spring 220 is arranged to push the planet lever 230 and the gear 204 away from each other. The planet lever 230 and the gear 204 are unified through friction engagement obtained by friction between the end face of the spring 220 and the end faces of the gear 204 and the planet lever 230. Therefore, when a load torque applied to the planet lever 230 comes to exceed the frictional resistance torque between the spring 220 and the planet lever 230, the planet lever 230 becomes capable of turning relative to the gear 204.

The planet lever 230 is in a flat shape as shown in FIG. 16(a). A spot facing hole 230c is formed in the middle part in the longitudinal direction of the lever 230 to have the bearing member 240 secured thereto. A shaft 230a which rotatably carries the gear 205 and a shaft 230b which rotatably carries the gear 208 are arranged to protrude from two end parts on one side of the lever 230. Further a protruding part 230d is formed at one end part of the lever 230 and is arranged to engage a planet lever positioning member which will be described later.

The gears 205 and 208 are stepped double gears having intermediate parts in their longitudinal direction formed in a shaft-like shape respectively. They consist of large gear parts 205a and 208a and small gear parts 205a and 208b respectively. The large gear parts 205a and 208a of the gears 205 and 208 are planet gears which are arranged to engage the small gear part 204b of the gear 204. The small gear part 204b acts as the sun gear.

In other words, the planet lever 230, the gear 204 (sun gear), the gears 205 and 208 (planet gears) and the spring 220 jointly form a planetary gear mechanism.

A first planet lever positioning member 252 is loosely fitted on the shaft-like part of the gear 208 between the large and small gears 208a and 208b. The first planet lever positioning member 252 axially extends outward from the shaft-like part and enters the hole part (or slot) 250B formed in the film winding base plate 250. A spring 253 which is fitted on the shaft-like part of the gear 208 strongly pushes the positioning member 252 against the end face of the gear 208a. The member 252 and the gear 208 are thus connected to each other by friction. When the member 252 moves within the above-stated slot 250B without any resistance, there takes place no slip between the member 252 and the gear 208. However, when the movement of the member 252 is prevented by its contact with the wall face of the slot 250B or the like, there takes place a slip between the member 252 and the gear 208 in such a way as to allow the gear 208 to rotate alone.

The details of the slots 250B and 250A which correspond to first and second planet lever positioning members 252 and 251 will be described later on.

Referring to FIG. 14, a gear 210 is a spool gear which is formed in one body with the spool 22. The gear 210 constantly engages the small gear part 209b of the gear 209. A gear 206 which has a large gear part 206a thereof arranged to engage the small gear part 205b of the planet gear 205 is disposed close to the gear 205 as shown in FIG. 14. The gear 206 is a double gear consisting of the large gear 206a and a small gear 206b. Between the large and small gears 206a and 206b is provided a coiled spring 215 for a one-way clutch function. One end of the spring 215 is secured to a boss 206c formed at the large gear 206a. The coiled spring 215 tightly presses the shaft part of the small gear 206b accordingly as the large gear 206a rotates clockwise to cause them to rotate together. A gear 207 is arranged to constantly engage the small gear 206b and to cause a sprocket assembly 29 to rotate through a shaft 216. The sprocket assembly 29 consists of sprockets 29a and 29b and a shaft 29c. An encoder plate P2 which has its whole circumference divided into 12 equal parts is secured to the gear 207. When the sprockets 29a and 29b make one turn, a circuit which is not shown but connected to a sliding contact piece S2 generates 12 pulses. Each of the sprockets 29a and 29b has six teeth. In the case of a 35 mm full-size type camera, the sprocket assembly feeds one frame portion of film when it makes 4/3 turn. Hence, for one frame, a total of 16 pulses are obtained via the contact piece S2. The equally dividing number of the encoder plate P2 of course may be selected and determined as desired.

The encoder plate P2, the sliding contact piece S2 and a circuit which is not shown partly form means for detecting a film feeding speed and a film winding amount. A rubber member 211a which facilitates automatic film winding on the spool 211 is applied to the whole circumferential surface of the spool 211. Further, a cover 212 is disposed in the neighborhood of the outer circumference of the spool 211 and is arranged to be turnable on a shaft 213 which is disposed in a stationary part of the camera. The cover 212 is pushed by a spring 214 toward the spool 211 and is thus arranged to expedite automatic film winding on the spool 211. Further, while only one set of the cover 212, the shaft 213 and the spring 214 are shown in the drawing, another set are disposed on the opposite side of the illustration.

The rotation of the sprocket 29b is transmitted to a gear 217 by a shaft connected and further to a detection gear 218 which engages the gear 217. The gear 217 and the detection gear 218 are in a gear ratio of 3:4. To the gear 218 is secured an encoder plate P3 which is arranged to generate one pulse per turn of the gear 218. The pulse is obtained at a circuit which is not shown but connected to sliding contact pieces S3 and S4. The sliding contact piece S3 is arranged to be ahead of the other sliding contact piece S4 by a given degree of phase. The driving operation of the motor M1 is changed over to a duty driving operation to lower its rotational frequency by the pulse generated by the sliding contact piece S3. After that, electrical control means promptly bring the rotation of the motor to a stop by brake application according to the pulse from the sliding contact piece S4.

The motor M1, controlled by the pulse which is generated per turn of the detection gear 218, feeds one frame portion of film in the case of a full 35 mm size camera. The arrangement to feed a full frame size amount of film per feeding process can be changed to half frame size amount feeding by changing the gear ratio between the gears 217 and 218 to a ratio 3:2 or by dividing the encoder plate P3 into two equal parts and by generating one pulse per 180 degree turn while leaving the gear ratio between the gears 217 and 218 in the ratio of 3:4. The camera can be easily arranged to be capable of selecting either the full size or the half size by switching the pulse counting number between one and two.

A stepped double gear 209 consisting of a large gear 209a and a small gear 209b is rotatably fitted on the other shaft 261 provided on the film winding base plate 250. A boss 209c protrudes from one end face of the small gear 209b. A second planet lever positioning member 251 is elastically fitted on the boss 209c and is arranged to enter the other slot 250A provided in the winding base plate 250. Since the member 251 is also not permanently connected to the gear 209 by utilizing the elastic contraction of the member 251, the gear 209 can be allowed to rotate alone when the member 251 comes to abut on the wall of the slot 250A and is thus blocked from further rotating during the process of rotation of the gear 209.

As shown in FIGS. 16(a) and 16(b), the slot 250A in which the above-stated second planet gear positioning member 251 is inserted is a simple trapezoidal shape having two opposed end faces 250a and 250b and inner and outer peripheral edges 250c and 250d which are in parallel to each other. The slot 250B in which the first planet lever positioning member 252 is inserted has two end faces 250e and 250f which are not opposed to each other and inner and outer peripheral edges 250g and 250h which are not in parallel to each other. The inner peripheral edge 250g is bent in the vicinity of the end face 250f. Therefore, the slot 250B consists of a pocket part 250B2 and a bottle neck bent part 250B1 located near the end face 250f.

Figure 18:
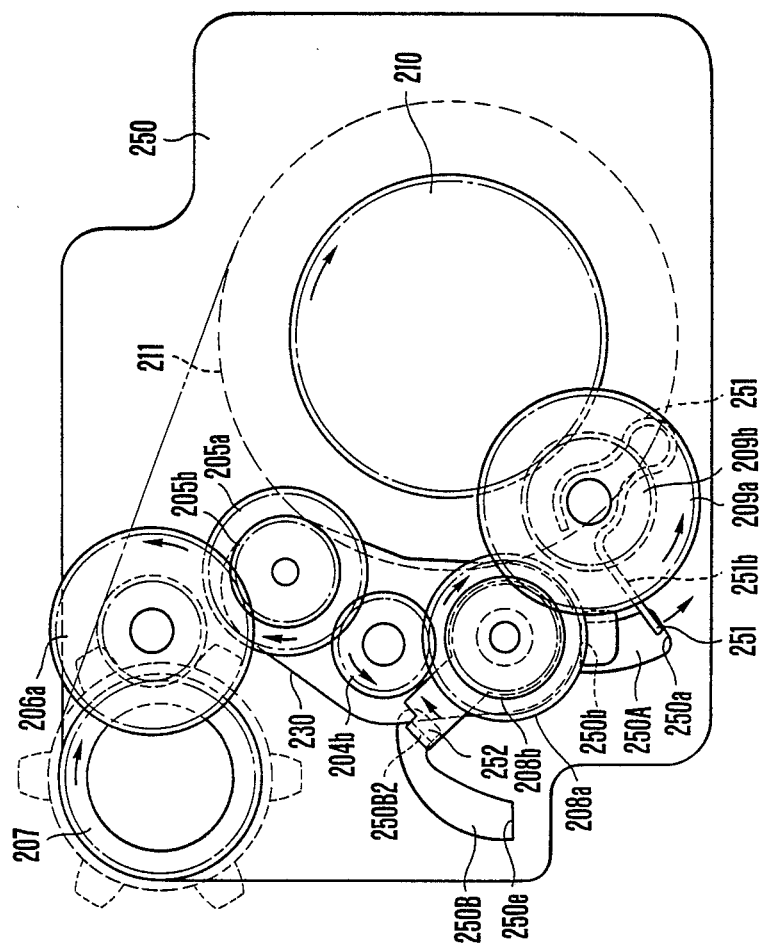
Figure 20:
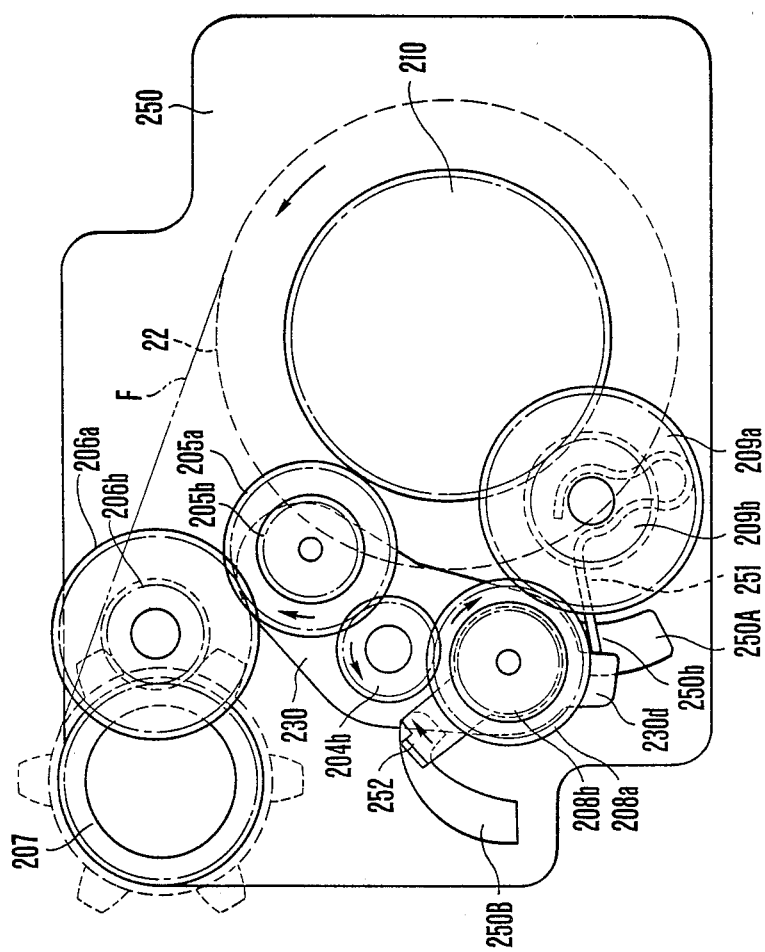
Figure 21:
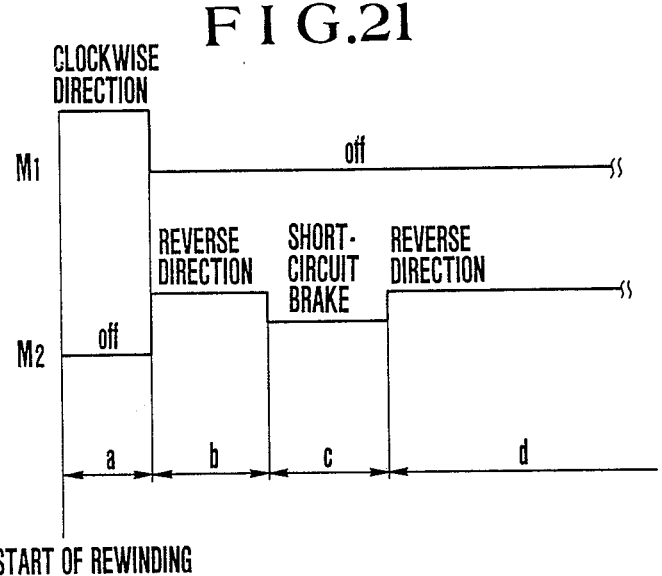
FIG. 21 is a time chart showing the sequence of operations of film winding and rewinding motors M1 and M2 performed in association with the action of the mechanism shown in FIG. 15.

FIG. 21 is a time chart showing the operations of the motors M1 and M2 performed for film rewinding. In rewinding the film, the planet lever positioning members 251 and 252 and the film winding mechanism operate as described below with reference to FIGS. 17 to 21:

At the start of film rewinding, the motor M1 is first allowed to rotate clockwise just for a period of time "a" under the condition shown in FIG. 17 or 18. This brings the gears and the planet lever positioning members 251 and 252 into their positions shown in FIG. 19.

Figure 19:
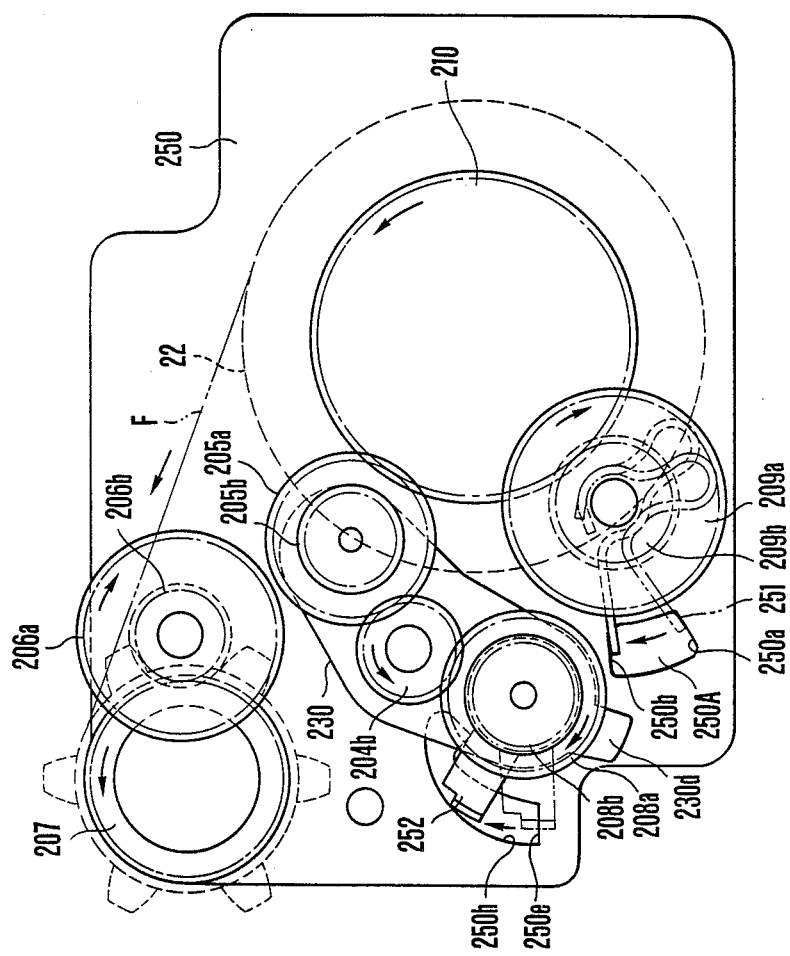

Next, the motor M2 is allowed to reversely rotate. Then, gears are driven by the medium of film F to rotate in the directions of arrows as shown in FIG. 19. In this instance, the second planet lever positioning member 251 rotates clockwise until it comes to abut on one end face 250b of the slot 250A of the winding base plate 250. Then, a counterclockwise swing of the planet lever 230 is prevented and change-over to the larger reduction ratio of the film winding transmission system is blocked as the first planet lever positioning member 252 abuts on the outer peripheral edge 250h of the slot 250B of the winding base plate 250.

Meanwhile, the first planet lever positioning member 252 turns clockwise to abut on the outer peripheral edge 250h and is in the position as shown in FIG. 19. The relation between the second planet lever positioning member 251 and the first planet lever positioning member 252 is as described below under the condition as shown in FIG. 19:

The counterclockwise rotation of the spool gear 210 causes the gear 209 to rotate clockwise. This in turn causes the second planet lever positioning member 251 to move from the end face 250a to the end face 250b. Meanwhile, the rotation is transmitted to the gears 205, 204 and 208 to cause the first planet lever positioning member 252 to move from the end face 250e to the peripheral edge 250h. During a period before arrival of the second planet lever positioning member 251 at the end face 250b where the member 251 prevents the planet lever 230 from effecting change-over to the larger reduction ratio, the counterclockwise turn of the planet lever 230 is prevented, because the first planet lever positioning member 252 abuts on the inner peripheral edge 250g of the slot 250B of the winding base plate 250. Therefore, change-over to the larger reduction ratio is impossible during this period. Further, even when the counterclockwise swing of the planet lever 230 becomes possible with the gears rotated in the directions of arrows and with the first planet lever positioning member 252 having reached the pocket part 250B2 of the slot 250B of the winding base plate 250, the change-over to the larger reduction ratio is prevented by the second planet lever positioning member 251.

Next, when short-circuit brake is applied to the motor M2 for a period of time "c", the film F, the spool 22 and the spool gear 210 come to a stop. However, the motor M1 and gears 201, 202, 203, 204, 205 and 208 are rotated by the force of inertia. This causes the planet lever 230 to turn counterclockwise to cut off transmission between the spool gear 210 and the gear 205a. The counterclockwise swing of the planet lever 230 is then blocked with the protruding part 230d of the lever 230 abutting on the planet lever positioning member 251.

With the protruding part 230d of the planet lever 230 abutting on the the second planet lever positioning member 251, transmission between the gears 208b and 209a is cut off to bring the planetary gear mechanism (planetary clutch) into a neutral state as transmission is cut off between the gear 205a and the spool gear 210.

In a case where the planet lever 230 is urged to turn clockwise by some external force, the planetary clutch can be kept in the neutral state a the first planet lever positioning member 252 abuts on the inner peripheral edge 250g of the slot 250B provided in the (film) winding base plate 250.

Next, the film is rewound under the condition of FIG. 20 with the motor M2 allowed to reversely rotate for a period of time "d". During this period, the planetary clutch remains in the neutral state. The winding motor M1 of the film winding transmission system is thus never driven by the motor M2 under this condition. The rewinding load thus can be lessened to a great degree.

The camera of this embodiment is of an automatic film leading type. When the back lid of the camera is closed with a film cartridge placed within the camera, the film is automatically rewound into the cartridge with only the tip of the leader part of the film left outside. After that, the film is automatically taken up on the spool 211 from the inside of the cartridge to have a first usable frame set in an aperture position. When the film leader part is automatically rewound after the cartridge is loaded, the film has not been wound around the spool 211 as yet. The film winding mechanism is then naturally in a state as shown in FIG. 20. Further, in the automatic process of taking up the film leader part on the spool 211, the film winding mechanism is set in the low speed reduction ratio state as shown in FIG. 18. More specifically, the motor M1 is rotated counterclockwise to operate the planetary gear mechanism to have the gear train of the low speed reduction ratio automatically set by the action of the planetary gear mechanism. Following this, the leader part of the film is guided to the spool 211 by means of the sprockets 29a and 29b. After the film leader part is thus wound around the spool 211, the spool 211 is brought to a stop.

Whether the film winding mechanism is to be set in the low speed driving state as shown in FIG. 18 as mentioned above or to be set in the high speed driving state as shown in FIG. 17 it is automatically decided according to various conditions, including the detected values of the voltage of the battery V1 disposed within the camera and that of the battery V2 disposed within the motor drive device MD, the presence or absence of the motor drive device MD on the camera, etc.. In other words, the rotation starting direction of the motor M1 is decided by a microcomputer disposed within the camera according to the detected voltage value of the battery, the presence or absence of the motor drive device, etc..

Figure 22:
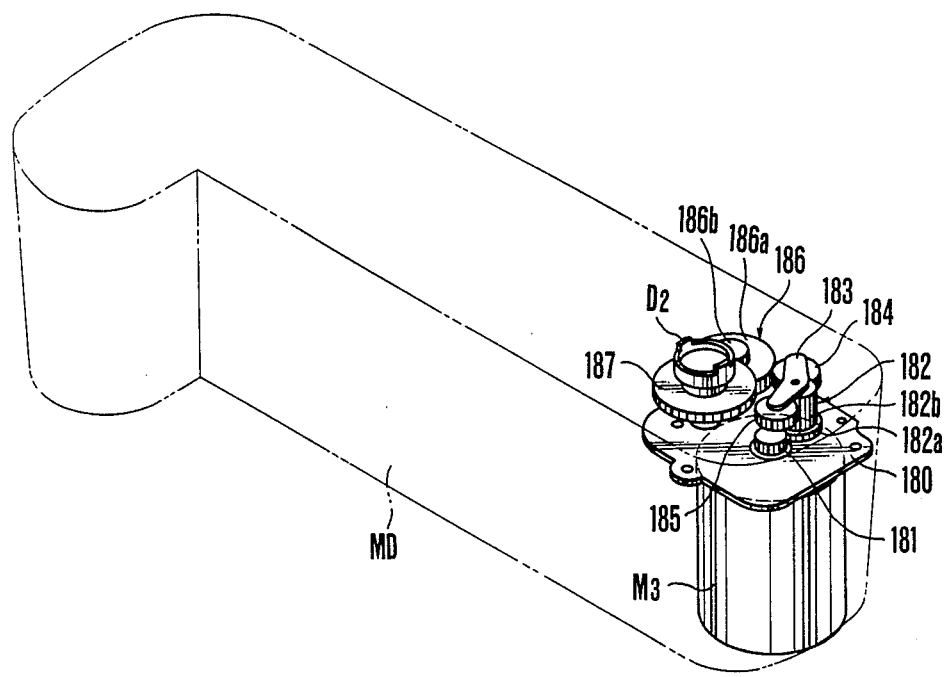
FIG. 22 is an oblique view showing a power transmission mechanism disposed within a motor drive device MD.
Figure 24:
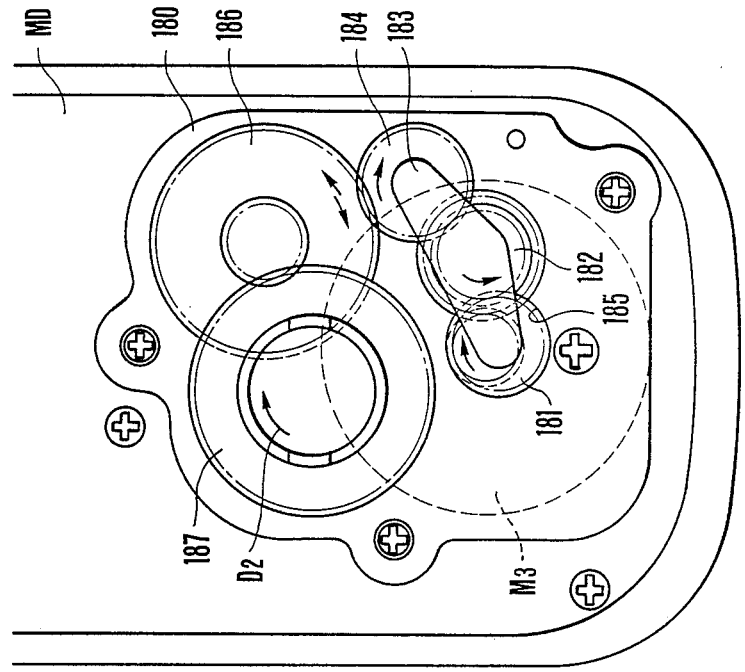
FIGS. 23 and 24 are plan views showing the power transmission mechanism of the motor drive device MD as in two different states.
Figure 23:
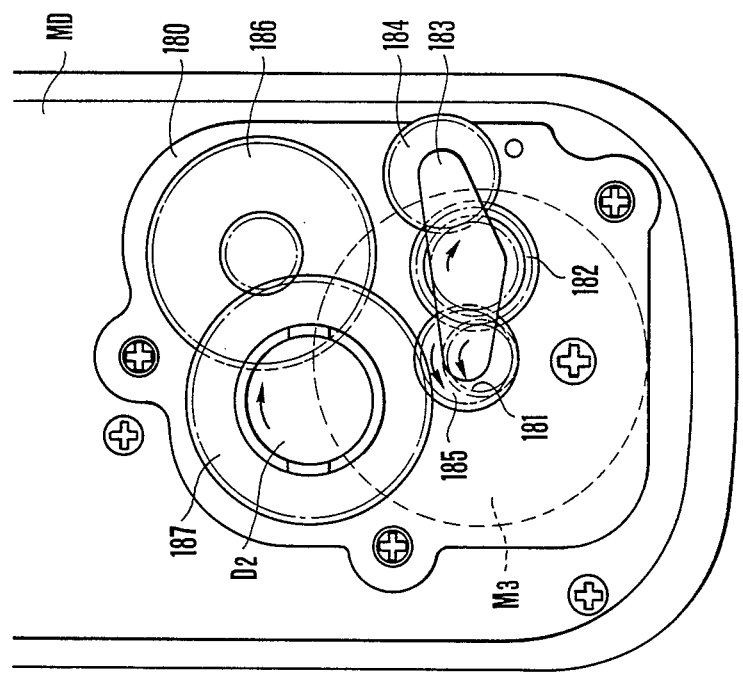

Arrangement of Power Transmission Mechanism K3 within Motor Drive Device (Auxiliary Drive Device) MD:

Referring to FIGS. 22 to 24, the structural arrangement of the power transmission mechanism K3 disposed within the motor drive device MD is as follows:

The power transmission mechanism K3 which is disposed within the motor drive device MD includes a high-speed transmission system which is arranged to turn the coupler D2 at a high speed; a low-speed transmission system which turns the coupler D2 at a low speed; and switching means for switching between the high-speed transmission system and the low-speed transmission system. The switching means has a mechanical operation part which is composed of a planetary gear mechanism. The switching means selects either the high-speed transmission system or the low-speed transmission system according to the started rotating direction of the motor M3. The started rotating direction of the motor M3 is determined by electrical control means according to the detected value of the terminal voltage of the battery V2, etc..

Referring to FIG. 22, a reference symbol M3 denotes the motor. The motor M3 is secured to a main base plate 180, which carries also various other mechanical parts. A pinion 181 is secured to the shaft of the motor M3. A stepped type sun gear 182 has a large gear 182a which is arranged to engage the pinion 181 and a small gear 182b which is arranged to engage planet gears. A planet lever 183 is arranged to frictionally engage the sun gear 182 through a spring which is not shown and to turn on the axis of the sun gear 182. Planet gears 184 and 185 are rotatably carried by the planet lever 183 and are arranged to constantly engage the small gear 182b of the sun gear 182. A stepped reduction gear 186 is disposed in a position to be capable of engaging the planet gear 184 and has a large gear 186a and a small gear 186b. A last stage gear 187 is secured to the shaft of the above-stated coupler D2 and is arranged to engage the gear 186b and the planet gear 185. The motor M3 is controlled to have its rotating direction determined according to the voltage of a battery V2 which is disposed within the motor drive device MD (see FIG. 1) and also according to the moving speed of the film.

FIG. 23 shows the gear engaging state of the power transmission mechanism K3 obtained when the voltage of the battery V2 is higher than a given value and also shows the rotating direction of the motor M3. FIG. 24 shows the gear engaging state of the power transmission mechanism K obtained when the voltage of the battery V2 is lower than the given value.

When the voltage of the battery V2 is higher than the given value, the motor M3 is rotated in such a way as to have the pinion 181 rotate counterclockwise. Then, the sun gear 182 is rotated clockwise. The planet lever also turned clockwise. The planet gear 185 is therefore caused to engage the gear 187. As a result, the gear 187 is driven at a high speed.

If the voltage of the battery V2 is lower than the given value, the motor M3 is rotated to have the pinion 181 rotate clockwise. In this instance, the sun gear 182 rotates counterclockwise. The planet lever 183 turns also counterclockwise. This causes the planet gear 184 to engage the gear 186. As a result, the gear 187 which is arranged in one body with the coupler D2 is driven at a low speed.

Figure 25B:
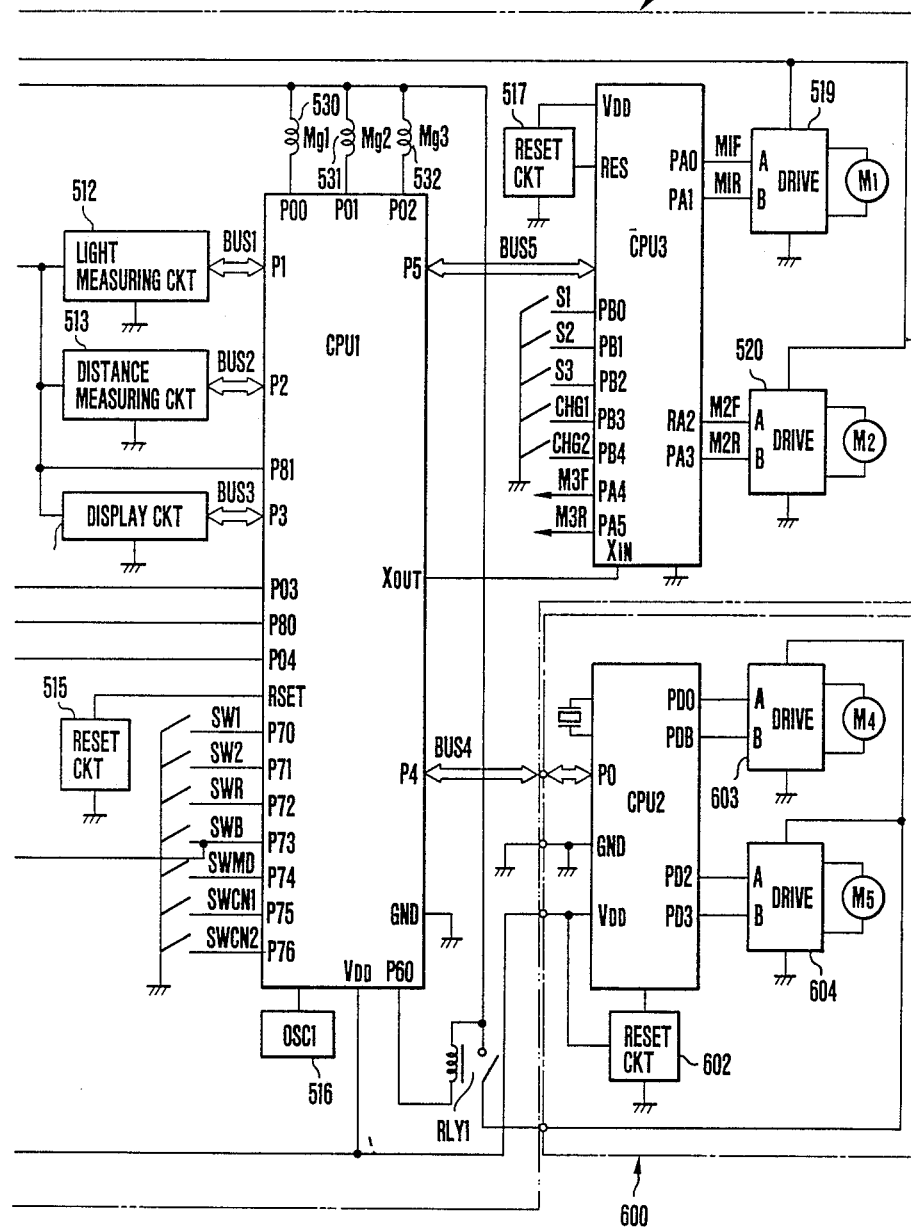

Further, means for detecting the terminal voltage of the battery V2 and a control circuit for the motor M3 are included in the electrical arrangement which is described in the following:

Electrical Arrangement of Camera and that of Motor Drive Device:

The electrical arrangement of the camera and that of the motor drive device are as described below with reference to FIGS. 25, 25(a) and 25(b):

In FIGS. 25, 25(a) and 25(b), a part 500 which is encompassed with a two-dot chain line represents an electrical circuit arrangement disposed within a camera body 500 (i.e., a camera body not including a lens barrel). A part 600 encompassed with a one-dot chain line represents an electrical circuit arrangement disposed within a lens barrel. Another part 700 encompassed also with a one-dot-chain line represents an electrical circuit arrangement disposed within the motor drive device MD.

The electrical arrangement within the camera body 500 is as follows: A grip 590 is attached to one side of the camera body 500. A lithium battery V1 of 6 V is disposed within the grip 590. Terminals VM1, VBAT1, GND, VBAT2, ExON, MD1, SVM, SWB', etc. are provided on a mounting face between the grip 590 and the camera body 500.

The grip mounting face of the camera body 500 is arranged to be used for mounting the motor drive device MD. Therefore, the motor drive device MD can be mounted on the mounting face after removal of the grip 590 from the camera body 500. The connection terminals VBAT1, GND, etc. are usable in common for the grip 590 and the motor drive device MD.

The camera body contains the following elements: a DC-DC converter 510 which serves as a constant voltage source for electronic circuits of varied kinds; a microcomputer (hereinafter referred to as CPU1) which controls various sequential operations; an oscillation circuit 516 which is arranged to supply a driving clock signal to the CPU1; a reset circuit 515 which is arranged to supply a reset signal to the CPU1; a light measuring circuit 512 which is connected to a port P1 of the CPU1 via a bus line BUS1; a distance measuring circuit 513 which is connected to a port P2 via a bus line BUS2; a display circuit 514 connected to a port P3 of the CPU1 via a bus line BUS3; the motors M1 and M2 mentioned in the foregoing; a driving circuit 519 for the motor M1; a driving circuit 520 for the motor M2; a control circuit CPU3 formed by a microcomputer (hereinafter referred to as CPU3) which is connected to a port P5 of the CPU1 via a bus line BUS5 and is arranged to control the motor driving circuits 519 and 520; an electromagnetic switch RLY1 which is connected to a port P60 of the CPU1 and is arranged to operate when the lens 600 is mounted; a reset circuit 517 which is arranged to give a reset signal to the CPU3; an electromagnet 530 which is arranged to release a shutter mechanism from a first clamped state in response to a shutter release operation; an electromagnet 531 which is arranged to unlock the leading curtain of the shutter; and another electromagnet 532 which is arranged to unlock the trailing curtain of the shutter. To the input ports P70 to P76 of the CPU1 are connected a switch SW1 which is arranged to act in response to the start of light and distance measuring actions; a switch SW2 which is arranged to turn on in response to the start of a shutter release action; a switch SWR which is arranged to act in response to the start of film rewinding action; a switch SWB which is arranged to detect mounting of the grip 590 or the motor drive device MD; a switch SWMD which is arranged to turn off in response to the ascent of a mirror (not shown) and to turn on in response to the descent of the mirror; a switch SWCN1 which turns off upon completion of the travel of the leading shutter curtain and to turn on upon completion of a charging action on a leading curtain moving mechanism; and a switch SWCN2 which is arranged to turn off upon completion of the travel of the tailing shutter curtain and to turn on upon completion of a charging action performed on a trailing curtain moving mechanism.

A port P80 of the CPU1 is provided for detecting the terminal voltages of the batteries V1 and V2 and is connected to a connection terminal MD1 which is disposed on the outside of the camera body.

The input ports PB0 to PB4 of the CPU3 which are provided for controlling the motors M1 and M2 are connected to switches S1 to S3 (corresponding to the sliding contact pieces S2 to S4 of FIG. 14) which are provided for detection of information on the travel of the film and also to switches CHG1 and CHG2 which are provided for detection of the operating state of the shutter charging transmission mechanism, etc.. Further, two ports PA4 and PA5 of the CPU3 are arranged to be connected to a motor driving circuit 702 which is disposed within the motor drive device MD. When the motor drive device MD is mounted, the CPU3 controls the motor M3 which is disposed within the motor drive device MD.

In FIG. 25 (b), reference symbols M1F, M1R, M2F, M2R, M3F and M3R shown at the port PA0 to PA5 of the CPU3 respectively denote signals for forward motor rotation F and reverse motor rotation R.

The lens (barrel) 600 which is removably mounted on the camera body 500 contains various circuit elements. They are arranged as follows: A microcomputer CPU2 (hereinafter referred to as CPU2) controls all the electrical actions to be performed within the lens barrel 600. A reset circuit 602 is arranged to supply a reset signal to the CPU2. A motor driving circuit 603 is arranged to control a motor M4 (for automatic focusing) under the control of the CPU2. Another motor driving circuit 604 is arranged to control a motor M5 (for diaphragm driving) under the control of the CPU2. The CPU2 is connected to the port P4 of the CPUI which is disposed within the camera body 500. The CPU2 and the reset circuit 602 receive a power supply from the DC-DC converter 510 disposed within the camera body via a connection terminal disposed near a lens mounting face. Meanwhile, the motor driving circuits 603 and 604 are arranged to receive a power supply via a connection terminal and an electromagnet RLY1 from the battery V1 of the camera B.

The motor drive device MD contains the following circuit elements: the above-stated battery V2 which is a 12 V battery (consisting of eight AA-size batteries in the case of this embodiment); the above-stated motor M3; a motor driving circuit 702 which is arranged to drive the motor M3 and to be controlled by the CPU2 disposed within the lens barrel; a DC-DC converter 701 which is arranged to be controlled by the CPU1 disposed within the camera body and to produce a constant voltage of 6 V; an electromagnetic switch RLY2 which is also controlled by a signal from the CPU1 and is arranged to supply a voltage of 6 V or a voltage of 12 V to a terminal VM1; and a switch 704 which is arranged to turn on when the motor drive device MD is mounted on the camera body. The motor drive device MD is provided with connection terminals VM1 to SWB which corresponds to the connection terminals disposed on the side of the camera body.

In the arrangement described above, control means of varied kinds are formed by the CPU1 and the CPU3 in conjunction with the switches SW1 to SWCN3, S1 to CHG2, etc. which are arranged to provide the CPU1 and the CPU3 with information of varied kinds. These control means include:

(a) Means for detecting mounting of the motor drive device MD on the camera body.

(b) Means for detecting the voltages of the batteries disposed within the camera body and the motor drive device.

(c) Means for selecting the reduction ratio of the film winding transmission system. The selecting means is arranged to automatically set the reduction ratio of the film winding transmission system either at a high reduction ratio or at a low reduction ratio according to the results of detection of the voltage of the power source within the camera body, film moving speed, etc. when the camera is used alone.

(d) Power transmission system matching means for matching the reduction ratio of the film winding transmission system with that of the transmission system disposed within the motor drive device in accordance with the detected voltage of the power source disposed within the motor drive device and the detected moving speed of the film when the camera is used in combination with the motor drive device by mounting the latter thereon.

(e) Constant voltage driving means for driving the film winding motor with a given constant voltage when either the battery disposed within the camera or the battery disposed within the motor drive device has a voltage above a given value.

(f) Tentative rotating means for causing the coupler of the motor drive device to tentatively rotate for adequately coupling it with the coupler of the camera in mounting the motor drive device on the camera.

(g) Detecting means for detecting whether the mechanism within the camera adequately operates when the coupler of the motor drive device is tentatively rotated.

(h) Motor impressed voltage increasing means for driving the film winding motor of the camera at a higher voltage when the camera is used together with the motor drive device than when the camera is used alone.

(i) Actuator operating mode selecting means for selecting a plural actuator operating mode most apposite to the voltage of the battery V2 by selecting a simultaneous supply or a time differentiated supply of currents to actuators including motors M1 to M5 and electromagnets 530 to 532 according to the battery voltage.

(j) Reduction ratio switching control means. The threshold values of the detected operation values of the mechanisms disposed within the camera which can be used as reference in selecting the reduction ratio of the film winding transmission system disposed within the camera and that of the power transmission system disposed within the motor drive device (or the detected voltage value of the battery) are set at values which vary according to whether the camera is used alone or together with the motor drive device. In accordance with the differently set threshold values, the reduction ratio switching control means selects the reduction ratio of the film winding transmission system for the solo use of the camera and the reduction ratios of the film winding transmission system and the shutter charging transmission system for use of the camera together with the motor drive device.

The details of these control means are as described below with reference to FIG. 26, etc.:

FIG. 26 is a time chart showing the photographing operation sequence of each part obtained (A) in a case where the reduction ratio of the film winding transmission mechanism K1 is set in the mode of low reduction ratio "Lo" for the solo use of the camera and (B) in a case where the film winding transmission mechanism K1 and the power transmission mechanism K3 which is disposed within the motor drive device MD are respectively set in the mode of low reduction ratios "Lo" with the motor drive device MD mounted on the camera.

FIG. 26 shows a manner in which the embodiment operates its actuators when the voltage of the battery V1 or V2 is lower than a given voltage value. In this instance, as shown, the sequence of power supply is controlled in such a way as to prevent the power supply from being effected to more than three actuators at a time.

FIG. 27 is another time chart showing the photographing operation sequence of each part obtained (C) in a case where the reduction ratio of the film winding transmission mechanism K1 is set in the high reduction ratio "Hi" for the solo use of the camera and (D) in a case where the film winding transmission mechanism K1 and the power transmission mechanism K3 which is disposed within the motor drive device MD are respectively set in their high reduction ratio modes "Hi" with the motor drive device MD mounted on the camera.

FIG. 27 shows a manner in which the embodiment operates the actuators when the voltage of the battery V1 or V2 is higher than the given voltage value. In that instance, more than three actuators simultaneously receive the power supply.

In other words, FIGS. 26 and 27 show the results of operation of the actuator operating mode selecting means which selects one of different modes of operating a plurality of actuators as mentioned in Para. (i) above.

Figure 28:
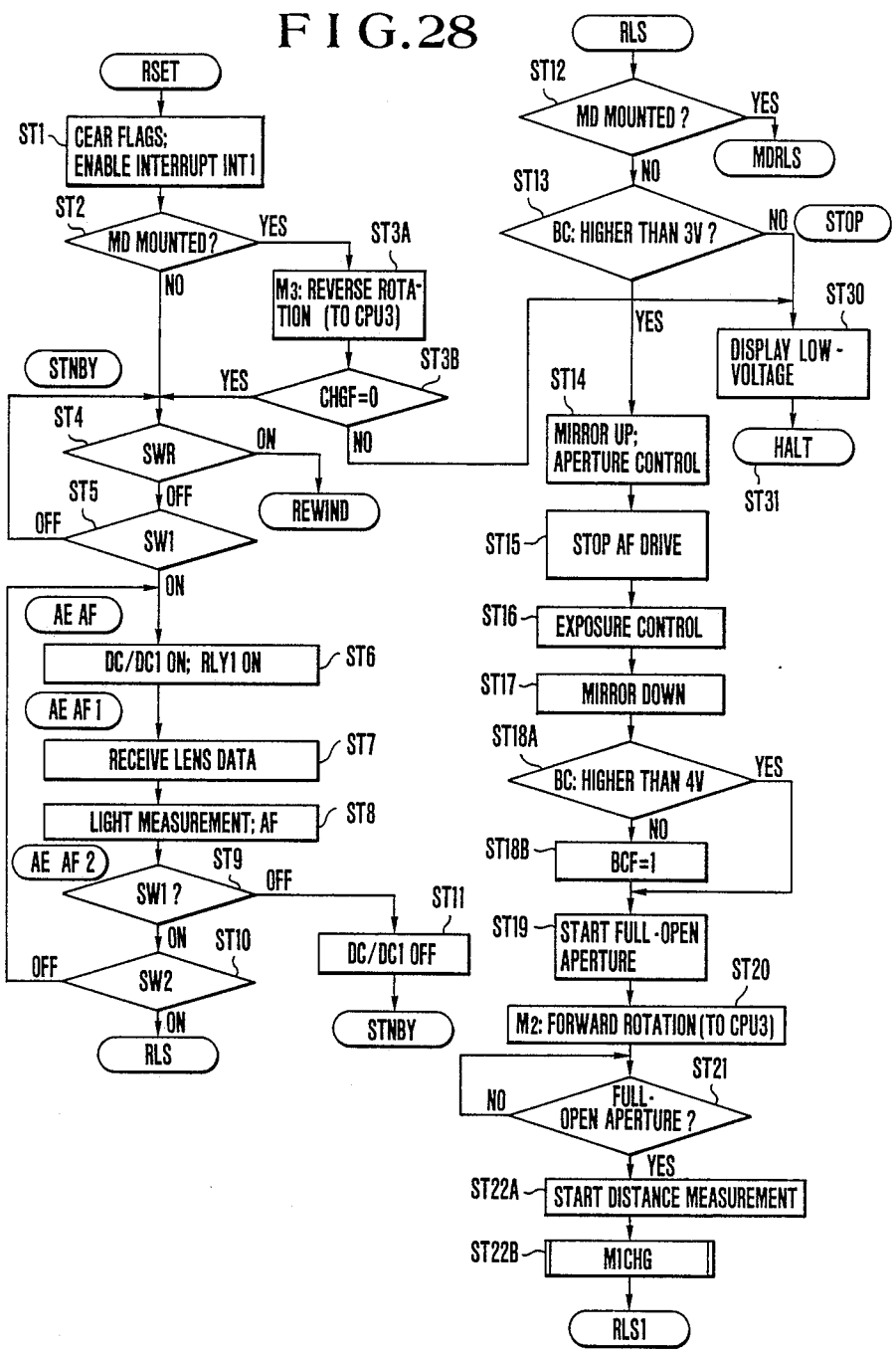
Figure 31:
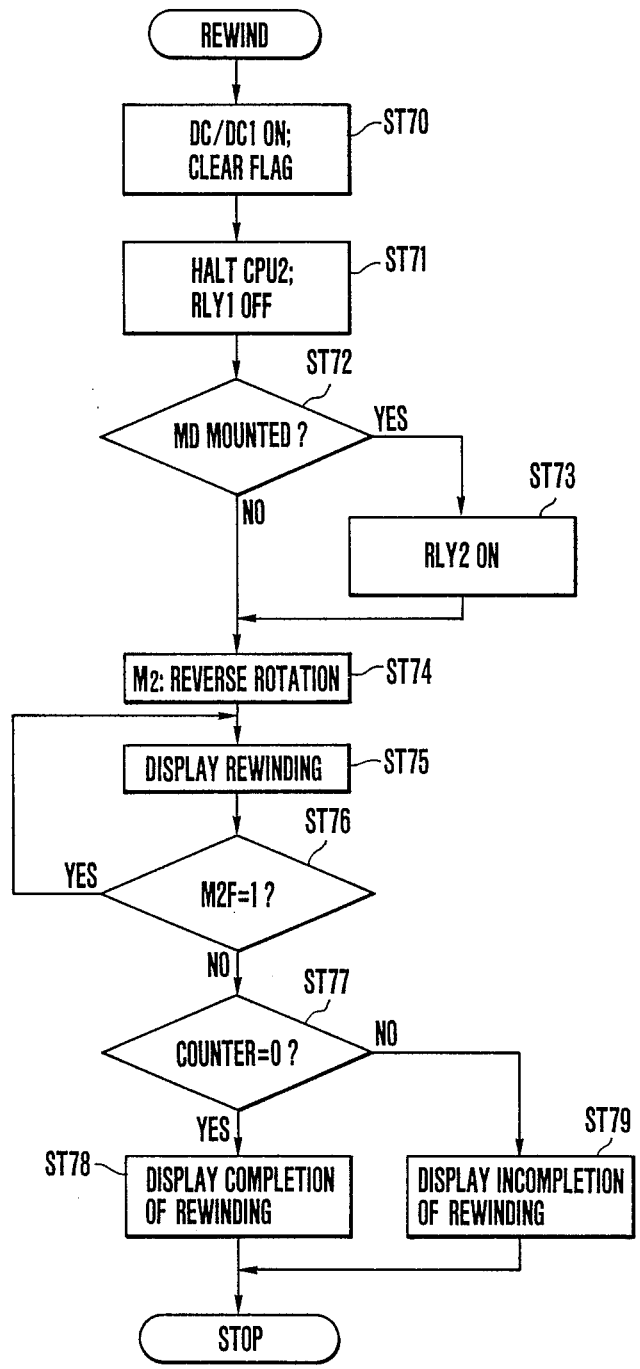
Figure 32:
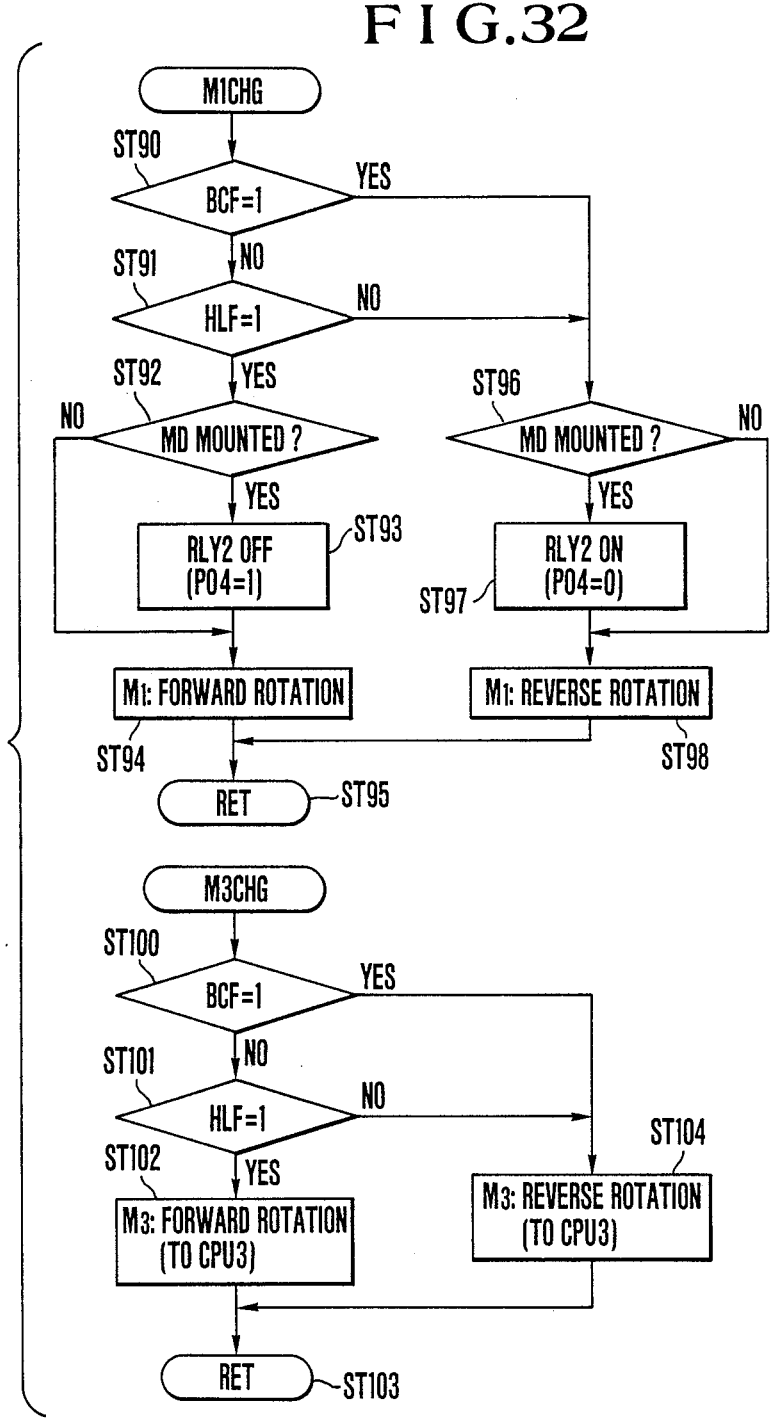
Figure 33:
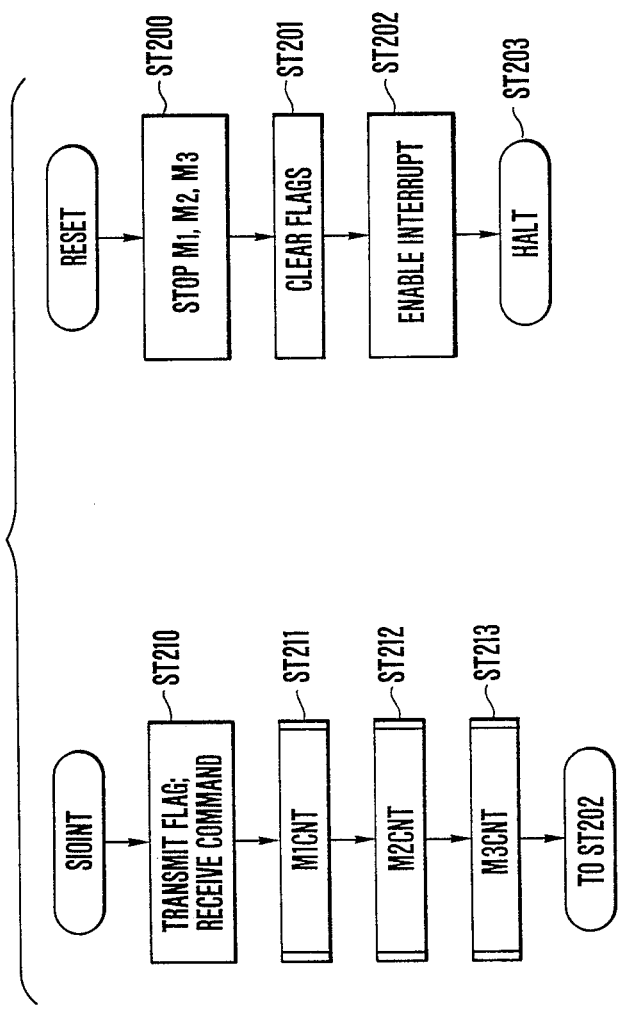
Figure 34:
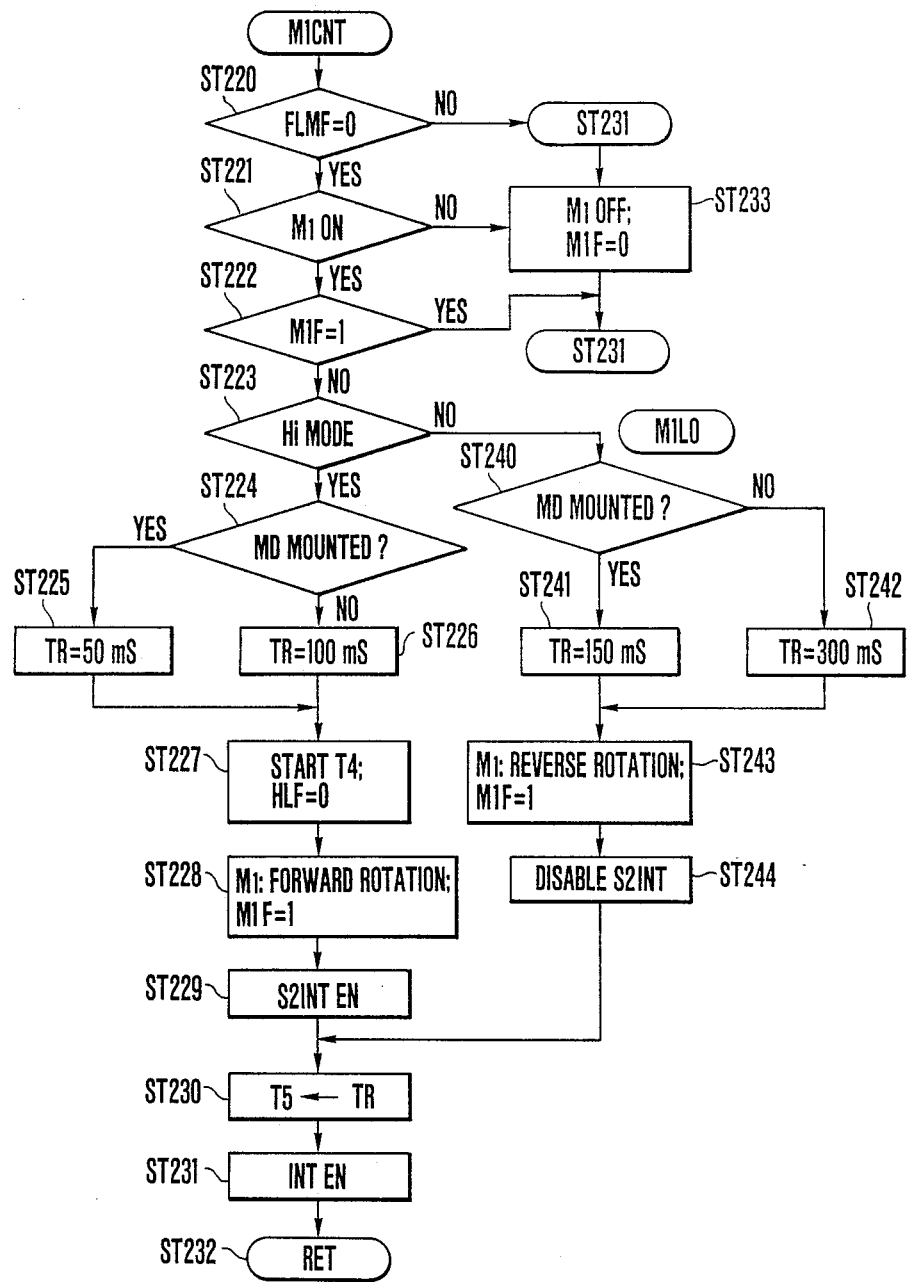
Figure 35:
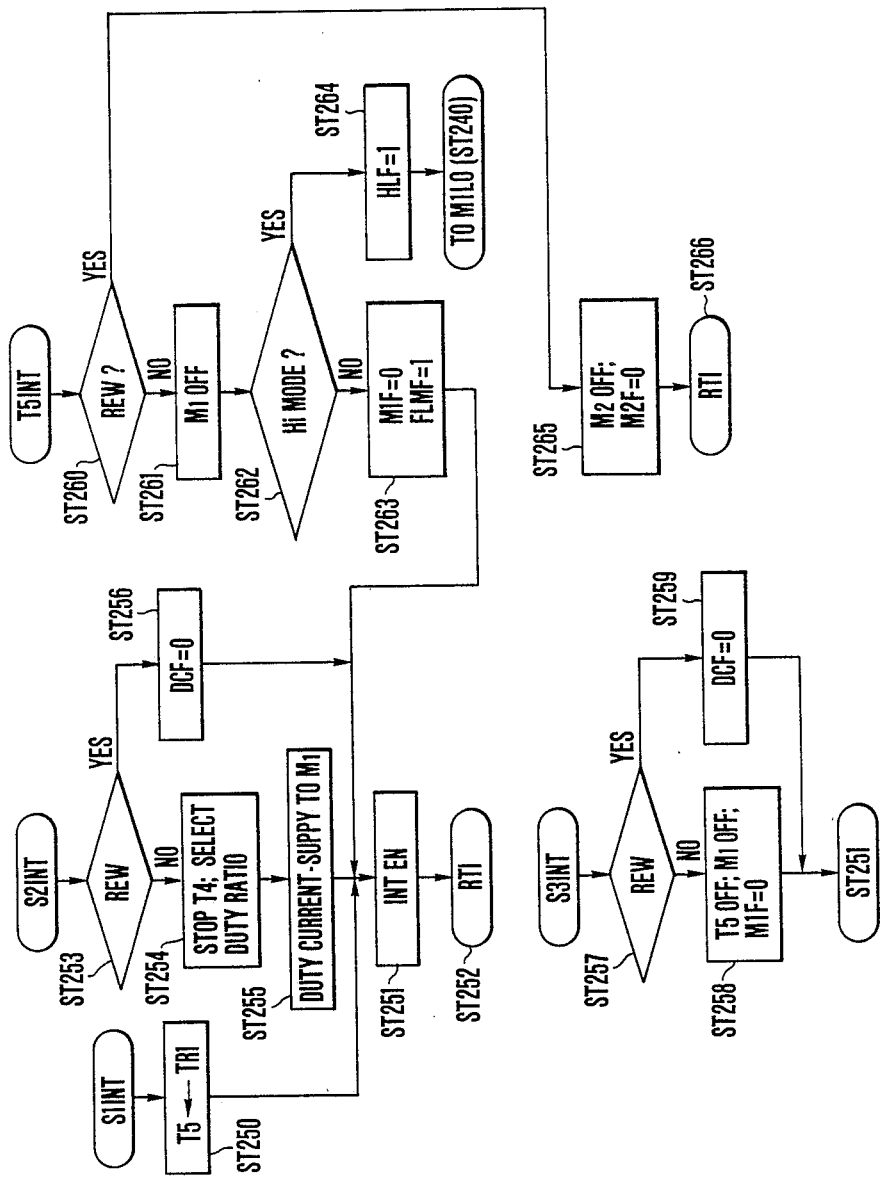
Figure 36:
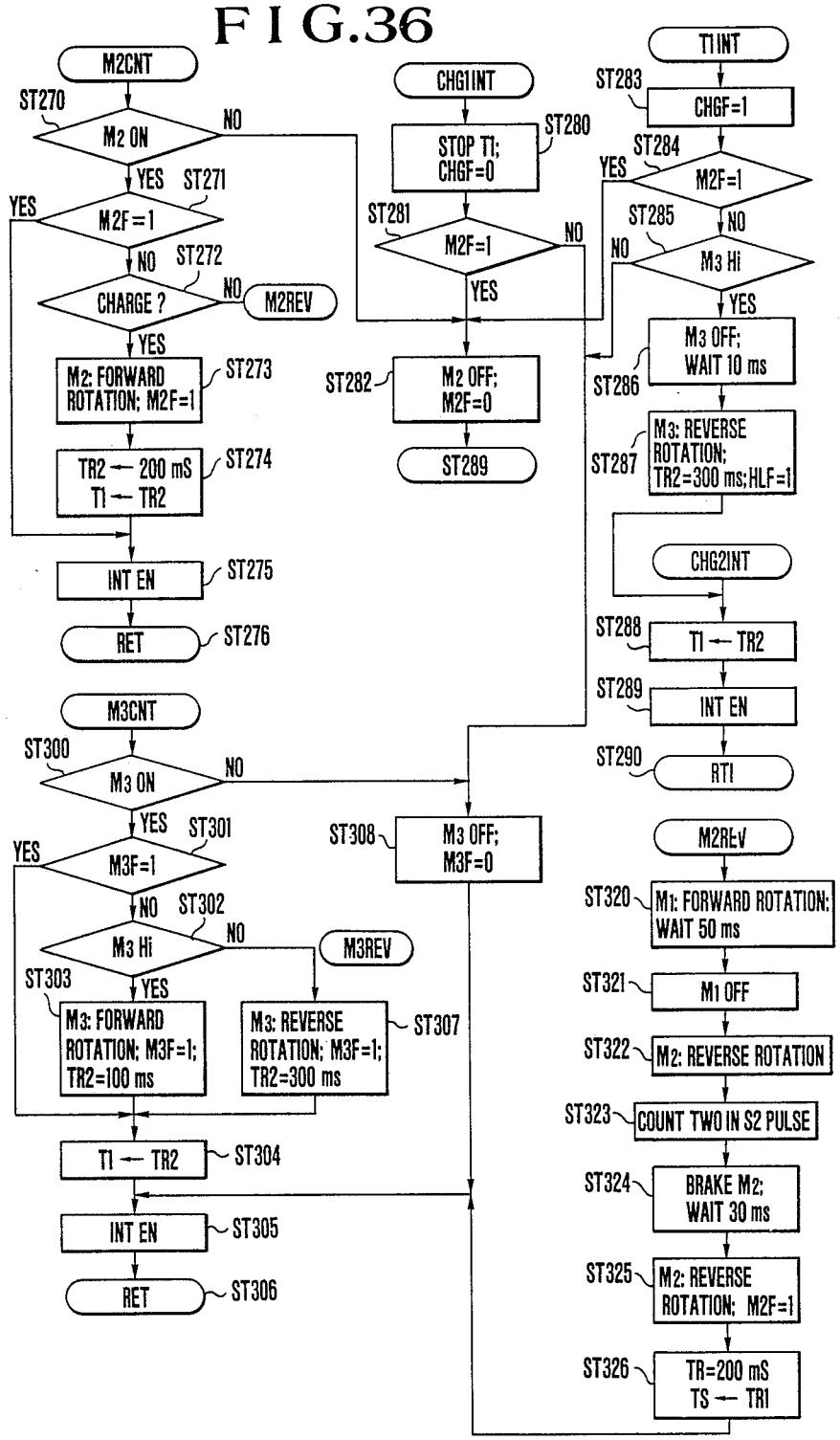

The drawings including FIG. 28 and ensuing ones are flow charts showing the programs to be executed by the CPU1, the CPU2 and the CPU3. The symbols, commands and flags shown in these flow charts are described as follows:

MD: motor drive device. AE: exposure control. AF: automatic focusing. RLS: release sequence in the case of solo use of the camera. MDRLS: release sequence in the case of use of the camera with the motor drive device mounted thereon. BC: battery check (for detecting battery voltage). The battery check levels include:

| First level: | 4 V | Second level: | 3 V |
|---|---|---|---|
| Third level: | 7 V | Fourth level: | 8 V |

Motor control signals are arranged as follows:
A=0; B=0: stop (open terminal)
A=1; B=0: forward rotation
A=0; B=1: reverse rotation
A=1; B=1: brake (short-circuiting two terminals)
Description of the commands and flags:
Data to be sent from the CPU1 to the CPU3:

| B7 | B6 | B5 | B4 | B3 | B2 | B1 | B0 |
|---|---|---|---|---|---|---|---|
| Command: | | | | | | | |
| X | MDF | M3C2 | M3C1 | M2C2 | M2C1 | M1C2 | M1C1 |

Command name:
MDF: Indicates the presence or absence of MD (0: MD is absent. 1: MD is present.)
M3C1, M3C2: Motor M3 control command
M2C1, M2C2: Motor M2 control command
M1C1, M1C2: Motor M1 control command
Motor control commands:

| C1, C2: | control | 0, 0: | stop (open) |
|---|---|---|---|
| 0, 1: | forward rotation | 1, 0: | reverse rotation |
| 1, 1: | stop (brake) | | |

Data to be sent from the CPU3 to the CPU1:

| B7 | B6 | B5 | B4 | B3 | B2 | B1 | B0 |
|---|---|---|---|---|---|---|---|
| Flag: X | DCF | HLF | CHGF | FLMF | M3F | M2F | M1F |

Flag names:

| | 0 | 1 | contents |
|---|---|---|---|
| DCF: | switch S2 on | switch S2 off | one film frame rewinding is detected. |
| HLF: | Lo mode | Hi mode | Feeding mode detected. |
| CHGF: | Charging is completed. | Charging is incompleted. | Mechanical charged state is indicated. |
| FLMF: | Film winding completed. | Film winding incompleted. | Film charging state is indicated. |
| M3F, M2F & M1F: | stop. | In operation. | State of motor is indicated. |

Flag of the CPU1:
Flag name: BCF

| 0 | 1 | contents |
|---|---|---|
| Voltage is high. | Voltage is low. | Indicates state of battery voltage. |

Description of timers:
T1: A timer for checking the charging action of M2.
T3: A timer for checking the charging action of M3.
T4: A timer for determining program duty.
T5: A timer for checking film winding and rewinding.
Communication between the CPU1 and the CPU2:

| Command | 00: Standby (halt). | 01: Open aperture. |
|---|---|---|
| | 02: Stop down aperture. | 03: Draw out lens. |
| | 04: Draw in lens. | 05: Transmit lens data. |
| | 06: Stop lens driving. | |

In the case of the commands 01 to 04, driving amount data of one byte for the command is sent from the CPU1 to the CPU2. In the case of the command "05", data of 2 bytes is sent from the CPU2 to the CPU1.
Data of the first byte: Full-aperture (max.) F No.
Data of the second byte: Focal length
The command "06" is for stopping the movement of the actuator of the lens.

In the following, the internal operation of the electronic circuits and the outline of the operation of the mechanical parts included in the embodiment are described with reference to FIG. 28 and ensuing figures:

Summarized Description of the Operation:

When the camera is used alone:

The film winding transmission mechanism K1 is set at the low reduction ratio. More specifically, the planet lever 230 is positioned to have the planet gear 208 engage the gear 209. The film rewinding and shutter charging transmission mechanism K2 transmits the power of the motor M2 via the gear 113 to the shutter charging transmission system as shown in FIG. 6 in the case of film winding or to the fork 143 via the gear 115 as shown in FIG. 9 in the case of film rewinding.

In photographing, the power supply to the motors M1, M2, M4 and M5 and electromagnets 530 to 532 is made in sequence as shown in the time chart of FIG. 26.

In rewinding the film, the mechanical connection of the film winding motor M1 to the spool is cut off. Electromagnetic switch RLY1 is opened to cut off the power supply to the motors M4 and M5 which are disposed within the lens barrel 600. The electronic circuit disposed inside the lens barrel 600 is held in a "halt" state. In the case of this embodiment, the film winding transmission mechanism is set at the low reduction ratio when the camera is used alone. However, the control system may be arranged to set the film winding mechanism K1 at the high reduction ratio in the event of a high battery voltage.

In using the camera with the motor drive device:

When the motor drive device is mounted on the camera body after the grip 590 is removed from the camera, the camera is electrically connected to the motor drive device via the connection terminal. The mounting of the motor drive device is electrically detected. Further, the battery V2 is connected to the applicable electronic circuit of the camera as a power source. The instant the motor drive device is mounted on the camera, the shutter charging transmission mechanism C is connected to the power transmission mechanism K3 disposed within the motor drive device. Then, the film rewinding transmission mechanism R is connected only to the motor M2. In other words, the gear 112 is brought into a state of constantly engaging the gear 115.

When the coupler D1 is engaged with the coupler D2, the motor M3 is first reversely rotated to set the power transmission mechanism K3 of the motor drive device at the low reduction ratio. The reverse rotation of the motor M3 then tentatively drives the shutter charging transmission mechanism C. Upon detection of the perfect operation of the shutter mechanism, etc. through the result of this tentative driving action, the camera proceeds to prepare for photographing by determining that the couplers D1 and D2 are perfectly coupled with each other. In the event of imperfect shutter charging, the power supply to the motor M3 and the actions of other electronic circuits are brought to a stop and the embodiment ceases to operate thereafter.

Since the motors M1 and M3 are receiving the power supply from the battery V2 (12 V) disposed within the motor drive device in this instance, the motor M1 can be driven at a higher speed when the camera is used alone. Further, the shutter charging transmission mechanism C which is to be driven by the motor M3 is also driven at a higher speed than in the case of the solo us of the camera.

The film winding transmission mechanism K1 and the power transmission mechanism K3 which is disposed within the motor drive device are set either at the high reduction ratio or the low reduction ratio according to the voltage of the battery V2. If the voltage of the battery V2 is higher than a given value, they are set at the high reduction ratio. When the film winding transmission mechanism K1 and the power transmission mechanism K3 are set at the high reduction ratio, the power supply to the motors M1 to M5 and to the electromagnets 530 to 532 is effected in a manner as shown in the time chart of FIG. 27. In other words, at least three of these actuators simultaneously receive the power supply in this instance.

However, if the voltage of the battery V2 drops to a value lower than the given value, the reduction ratio of the film winding transmission mechanism K1 and that of the power transmission mechanism K3 are changed to the low reduction ratio (by reversely rotating the motors M1 and M3). Then, the power supply to the motors M1 to M5 and the electromagnets 530 to 532 is effected in the sequence as shown in the time chart of FIG. 26. In that instance, the simultaneous power supply is effected only to less than three of these actuators.

In rewinding the film, the connecting position of the electromagnetic switch RLY2 is changed from a contact "a" over to a contact "b". Then, a maximum voltage of 6 V is applied from the DC-DC converter 701 to the motor M2. This causes the motor M2 to drive the film rewinding transmission mechanism R with the same output as in the case of using the camera alone.

Description of the Circuit Operation (Flow Charts):

When the battery V1 is set within the grip 590, a voltage of 6 V is produced at the terminals VBAT1 and VBAT2. This voltage is applied to the terminal VIN of the DC-DC converter 510 (DC/DC1). The converter then produces a voltage of 3 V from its output terminal VDD. This voltage output is applied to the reset circuit 515 and the CPU1. The CPU1 begins to oscillate. When a high level (H) reset signal is produced from the reset circuit 515 after that, the CPU1 begins to operate from a step ST1 as shown in FIG. 28. The CPU2 and the reset circuit 602 act in the same manner as the CPU1 and take a standby mode. Referring to FIG. 28, the CPU1 operates as follows:

At the step ST1: Flags and output ports are set at "0". Step ST2: A check is made for the voltage of the input port P80. If the voltage is found to be above 2 V (with the motor drive device MD mounted), the flow of operation proceeds to a step ST3. Since the battery of 6 V is set, the input voltage is 0 V (MD is not mounted) in this instance and the flow comes to a step ST4. (Detection of MD mounting) Step ST3A: Data is sent via the BUS5 to the CPU3 for charging at a low gear ratio. This causes the motor M3 to reversely rotate to set the power transmission mechanism within the motor drive device MD at the reduction ratio for a low speed. Then, the shutter charging transmission mechanism C disposed within the camera is tentatively operated through the couplers D1 and D2. Step ST3B: A check is made to see if the charging action is adequately performed with the couplers correctly coupled with each other. If the charging action has been completed and the flag CHGF is at 0 (CHGF=0), the flow proceeds to the step ST4.

If not (CHGF=1), the flow comes to a stop at a step ST30.

Step ST4: The rewinding switch SWR is checked. If the switch SWR is found to have been pushed, the flow comes to a subroutine "REWIND". If not, the flow proceeds to a step ST5. Step ST5: The switch SW1 is checked to see if it has been pushed. If so, the flow proceeds to a step ST6. If not, the flow comes back to the step ST4. Step ST6: The CPU1 renders the converter 510 (DC/DC1) operative by making the level of its output port P03 low. With the converter DC/DC1 thus operated, a voltage of 5 V is produced from its output terminal Ex. The CPU1 checks the voltage of its port P81. If the voltage is found to be at 5 V, the output level of its port P60 is set at a low level to turn on the electromagnetic switch RLY1. With the switch RLY1 turned on, a voltage VBAT is supplied to the lens circuit 600. The flow then comes to a step ST7. Step ST7: The CPU1 communicates with the CPU2 via the BUS4 to receive the intrinsic data of the lens. The flow then comes to a step ST8. Step ST8: The light and distance measuring circuits are rendered operative via the BUS1 and the BUS2. An automatic focusing (AF) computing operation is carried out on data received. The AF data thus obtained is sent to the CPU2 via the BUS4. This causes the AF motor M5 to operate for an automatic focusing action. Further, an automatic exposure control computing operation is performed according to measured light data. The result of the operation is sent via the BUS3 to a display circuit 514 for a display. Step ST9: A check is made to see if the switch SW1 has been pushed. If so, the flow comes to a step ST10. If not, the flow comes to a step ST11. Step ST10: The switch SW2 is checked to see if it has been pushed. If so, the flow comes to a step ST12. If not, the flow comes back to the step ST6. Step ST11: The output level of the port P03 is set at a high level to turn off the DC-DC converter DC/DC1. After that, the flow comes back to the step ST4. Step ST12: A check is made to find if the motor drive device MD is mounted. If so, the flow comes to a subroutine "MDRLS". If not, the flow proceeds to a step ST13. Step ST13: A check is made for the voltage of the battery. If the battery voltage is found to be above 3 V (a second level), the flow proceeds to a step ST14. If the voltage is found to be less than 3 V, the flow comes to a stop at the step ST30. (Detection of the battery voltage)

Step ST14: The output level of the output port P00 is set at a low level of 10 ms to energize the electromagnet Mg1 for a mirror-up action. Further, an aperture control signal is sent out via the BUS4 to operate the motor M4 for aperture control. Step ST15: An instruction for stopping the driving action of the AF motor M5 is sent out via the BUS4 to bring the AF action to a stop. Step ST16: Pulse signals which are formed in accordance with a shutter time are sent to the output ports P01 and P02 for exposure control.

Step ST17: The level of the output from the output port P00 is set at the low level of 10 ms to energize the electromagnet Mg1 for moving the mirror down. Step ST18A: The battery voltage is checked. If the battery voltage is above 4 V (a first level), the flow comes to a step ST19. If not, the flow proceeds to a step ST18B. Step ST18B: The flag is set at "1" and the flow proceeds to the step ST19. Step ST19: An instruction for opening the aperture is sent to the CPU2 through the BUS4. Step ST20: An instruction for the forward rotation of the motor M2 is sent via the BUS5 to the CPU3 for mechanical charging. Step ST21: The flow waits for arrival of information on completion of the aperture opening action from the CPU2. Step ST22A: A distance measuring action begins. Step ST22B: A subroutine "M1CHG" for driving the motor M1 is executed by sending data via the BUS5 to the CPU3. The motor M1 either rotates forward or rotates backward according to the value of the flag BCF. (The reduction ratio of the film winding transmission system is selected according to the level of the battery voltage.) Step ST23: The flow waits for arrival of information on completion of the action of the motor M2 (M2F=0) from the CPU3.

Step ST24: A check is made to see if the mechanical charging action has been completed. If so (CHGF=0), the flow proceeds to a step ST25. If not (CHGF=1), the flow comes to a stop. Step ST25: An instruction for a lens driving action is sent to the CPU2 via the BUS4. Step ST26: The flow waits for arrival of information on completion of the action of the motor M1 (M1F=0) from the CPU3. Step ST27: A check is made to see if a film charging action has been completed. If so (FLMF=0), the flow comes back to the step ST7. If not (FLMF=1), the flow proceeds to a subroutine "REWIND".

Sequential operation for shutter release to be performed with the motor drive device MD mounted (MDRLS):

Step ST40: The battery voltage is checked. If the voltage is above 5 V (a fourth level), the flow proceeds to a step ST41. If not, the flow comes to a stop. (Detection of battery voltage) Step ST41: The mirror is moved up by making the output level of the output port P00 low (L) to energize the electromagnet Mg1. An aperture control signal is sent via the BUS4 for operating the motor M4 to control the aperture. Step ST42: The flow waits for arrival of information on completion of the action of the the motor M1 (M1F=0) from the CPU3. Step ST43: A check is made for completion of film charging. If it has been completed (FLMF=0), the flow proceeds to a step ST44. If not (FLMF=1), the flow comes to the subroutine "REWIND". Step ST44: An instruction for stopping the driving action of the AF motor M5 is sent out via the BUS4 to bring the AF action to a stop. Step ST45: An exposure control action is performed by sending pulse signals from the output ports P01 and P02 according to the shutter time. Step ST46: The level of the output from the output port P00 is set at the low level of 10 ms to energize the electromagnet Mg1 for moving the mirror down. Step ST47: The battery voltage is checked to see if it is above 7 V (a third level). If so, the flow proceeds to a step ST48. If not, the flow comes to a step ST60. Step ST48: An instruction for opening the aperture is sent to the CPU2 via the BUS4. Step ST49: A signal is sent to the CPU3 via the BUS5 to have a subroutine "M3CHG" executed by driving the motor M3. Step ST50: A signal is sent to the CPU3 via the BUS3 to have a subroutine "M1CHG" executed by driving the motor M1.

Step ST51: The flow waits for arrival of information on completion of the aperture opening action from the CPU2. Step ST52A: A check is made to see if the switch SW1 has been pushed. If so, the flow proceeds to a step ST52B. If not, the flow comes to a step ST54. Step ST52B: If the flag BCF is at "0", the flow comes to a step ST53. If it is at "1", the flow proceeds to a step ST52C. Step ST52C: Light and distance measuring actions only are performed. Meanwhile the focusing motor M5 is inhibited from driving. Step ST52D: If the flag M3F is at "0", the flow proceeds to a step ST52E. If the flag M3F is at "1", the flow comes back to the step ST52C to repeat the light and distance measuring actions only. Step ST52E: The focusing motor M5 is allowed to drive. The flow then comes to the step ST54. Step ST53: The light measuring action, the distance measuring action and the AF action are performed. Step ST54: A check is made to see if the operation of the motor M3 has been completed (M3F=0). If M3F=1, the flow comes back to the step ST52A. Step ST55: A check is made to see if the mechanical charging action has been completed. If so (CHGF=0), the flow proceeds to a step ST56. If not (CHGF=1), the flow comes to a stop. Step ST56: The switch SW2 is checked to see if it has been pushed. If so, the flow comes to the step ST40. If not, the flow proceeds to a step ST57. Step ST57: The flow waits for arrival of information on completion of the action of the motor M1 (M1F=0) from the CPU3. Step ST58: A check is made to see if the film charging has been completed. If so (FLMF=0), the flow comes back to the standby step ST4. If not (FLMF=1), the flow comes to the subroutine "REWIND".

MDL mode (the power transmission mechanism K3 is set at the low reduction ratio with the motor drive device mounted on the camera):

Step ST60: An instruction for opening the aperture is sent to the CPU2 via the BUS4. Step ST61: The flag BCF is set at "1". (Result of battery voltage detection) Step ST62: An instruction for driving the motor M3 is sent via the BUS5 to the CPU3. The mechanical charging action is performed. Since the flag BCF is at "1", the charging action is performed at the low gear ratio. (Selection of the rotating direction of the motor M3 and selection of the gear ratio)

Step ST63: The flow waits for arrival of information on completion of the aperture opening action from the CPU2. Step ST64: The distance measuring action begins. Step ST65: An instruction for driving the motor M1 is sent via the BUS5 to the CPU3 to perform film charging. Since the flag BCF is at "1", the film charging action is performed at the low gear ratio. (Selection of the rotating direction of the motor M1 and that of the gear ratio) Step ST66: The flow waits for arrival of information on completion of the action of the motor M3 (M3F=0). When the information M3F=0 is obtained, the flow comes to the step ST24.

Sequential operation for film rewinding:

Step ST70: The DC-DC converter DC/DC1 is turned on. The flag is cleared. Step ST71: The output level of the output port P60 is set at a high level ("H") to turn off the electromagnetic switch RLY1. The command HALT is sent to the CPU2 to bring the CPU2 into a low electric energy consuming state. Step ST72: A check is made for the presence or absence of the motor drive device MD. If the motor drive device MD is found to be mounted, the flow comes to a step ST74. If not, the flow proceeds to a step ST73. Step ST73: The output level of the output port P04 is set at a low level to turn on the electromagnetic switch RLY2. As a result, the voltage of the terminal VM1 becomes 6 V. Step ST74: A command for the start of a film rewinding action is sent to the CPU3. Step ST75: A state of film rewinding is displayed. (The film counter down counts by counting a number of times for which flag S3F=0 is obtained from the CPU 3.) Step ST76: A check is made to see if the action of the motor M2 has come to an end (M2F=0). In the case of M2F=1, the flow comes back to the step ST75. Step ST77: The counted value of the film counter is checked. If it is found to be zero, the flow proceeds to a step ST78. If not, the flow comes to the step ST79. Step ST78: Completion of film rewinding is displayed. Step ST79: Incompletion of film rewinding is displayed.

M1CHG:

This program is provided for determining the driving direction of the motor M1 between forward rotation and reverse rotation. Step ST90: The flag BCF is checked for its value. If the flag BCF is at "0", the flow proceeds to a step ST91. If it is at "1", the flow comes to a step ST96. Step ST91: The flag HLF is checked for its value. If the flag HLF is found to be at "1", the flow proceeds to a step ST92. If it is "0", the flow comes to the step ST96. Step ST92: A check is made for the presence of the motor drive device MD. If the motor drive device MD is mounted, the flow proceeds to a step ST93. If not, the flow comes to a step ST94. Step ST93: The output level of the output port P04 of the CPU1 is set at a high level to turn off the electromagnetic switch RLY2. Then, the driving voltage for the motor M1 is increased to 12 V. (The voltage applied to the motor M1 is increased with the device MD mounted on the camera.) Step ST94: An instruction for the forward rotation of the motor M1 (for the high gear ratio) is sent to the CPU3. (Selection of the film winding system gear ratio for the solo use of the camera.) Step ST95: The flow comes back to the former program. Step ST96: A check is made for the presence of the motor drive device MD. If the device MD is mounted, the flow proceeds to a step ST97. If not, the flow comes to a step ST98. Step ST97: The output level of the output port P04 of the CPU1 is set at a high level. The electromagnetic switch RLY2 is thus turned on to set the driving voltage of the motor M1 at 6 V. Step ST98: An instruction is sent to the CPU3 for the reverse rotation of the motor M1 (for the low gear ratio). The flow then comes to the step ST95. (Selection of the low gear ratio of the film winding system with the device MD mounted on the camera)

M3CHG:

This program is provided for determining whether the motor M3 is to be forwardly or reversely rotated. Step ST100: The flag BCF is checked for its value. If it is at "0", the flow proceeds to a step ST101. If not, the flow comes to a step ST104. Step ST101: The flag HLF is checked for its value. If it is "1", the flow proceeds to a step ST102. If it is "0", the flow comes to the step ST104. Step ST102: An instruction is sent to the CPU3 for the forward rotation of the motor M3 (for selection of the higher speed gear train). Step ST103: The flow comes back to the former program. Step ST104: An instruction is sent to the CPU3 for the reverse rotation of the motor M3 (for selecting the lower speed gear train). The flow then comes to the step ST103.

Sequential operation of the CPU3:

When the DC-DC converter DC/DC1 is turned on by the CPU1, a voltage of 5 V is applied to the reset circuit 517 and the CPU3. Then the level of a reset signal produced from the reset circuit 517 becomes high to cause the CPU3 to operate starting with a step ST200. Step ST200: The motor control output levels of the ports PA0 to PA5 are set at low levels. (Motors are stopped.) Step ST201: Flags are cleared. Step ST202: Interruptions are allowed. Step ST203: The flow comes to a halt.

Interruptions from the CPU1:

Step ST210: Upon receipt of a command from the CPU1, the flag of the CPU3 is sent. Step ST211: A subroutine for controlling the motor M1 is called. Step ST212: A subroutine for controlling the motor M2 is called. Step ST213: A subroutine for controlling the motor M3 is called.

Motor M1 control subroutine:

Step ST220: The flag FLMF is checked. If it is found to be at "1", the flow comes to a step ST233. If it is "0", the flow comes to a step ST221. Step ST221: The motor M1 control instruction from the CPU1 is checked (a discrimination between the command bits "0" and "1"). If it is found to be a halt command, the flow comes to a step ST233. If it is a driving command, the flow proceeds to a step ST222. Step ST222: The flag M1F indicating the operation of the motor M1 is checked. If it is found to be at "1" (indicating that the motor M1 is in action), the flow comes to a step ST231. If the flag is at "0" (indicating that the motor M1 is in repose), the flow proceeds to a step ST223. Step ST223: A check is made for the driving mode of the motor M1. The flow proceeds to a step ST224 if it is in a mode "Hi" (forward rotation) or comes to a step ST240 in the event of a mode "Lo" (reverse rotation). Step ST224: A check is made for the presence of the motor drive device MD. If the device MD is mounted, the flow proceeds to a step ST225. If not, the flow comes to a step ST226. Step 225: A register TR is set at 50 ms. The flow then comes to a step ST227. Step ST226: The register TR is set at 100 ms. The flow then proceeds to the step ST227. Step ST227: A timer T4 is allowed to start from "0". The flag HLF is set at "0". Step ST228: The output level of the port PA0 is set at a high level (H) and that of the port PA1 at a low level (L) to cause the motor M1 to rotate forward. The flag M1F is set at "1". Step ST229: The switch S2 is allowed to interrupt. Step ST230: The timer T5 is set at the value of the register TR and down counting begins. Step 231. An interruption is allowed. Step ST232: The flow comes back to the main program. Step ST233: The output levels of the parts PA0 and PA1 are set at "H" to bring the rotation of the motor M1 to a stop in a state of having brake application. The flag M1F is set at "0" and the flow come to the step ST231. Step ST240: A check is made for the presence of the motor drive device MD. If the device MD is mounted, the flow proceeds to a step ST241. If not, the flow comes to a step ST242. Step ST241: The register TR is set at 150 ms. The flow comes to a step ST243. Step ST242: The register TR is set at 300 ms. The flow proceeds to a step ST243. Step ST243: The output levels of the port PA0 is set at "L" and the port PA1 at "H" to have the motor M1 reversely rotate. The flag M1F is set at "1". Step ST244: The interruption of the switch S2 is disabled. The flow then comes to a step ST229.

Interruptions by switches S1, S2 and S3 and a timer T5:

Interruption by the switch S1:

Step 250: The timer T5 is set at the value of the register TR and down-counting begins. Step ST251: The interruption is allowed. Step ST252: The flow comes back to the program preceding the interruption.

Interruption by the switch S2:

Step ST253: The flow comes to a step ST256 if the camera is in the process of film rewinding or to a step ST254 if the camera is in the process of film winding. Step ST254: The operation of the timer T4 is brought to a stop and a duty ratio corresponding to the value of the timer T4 is selected. Step ST255: The speed of the motor M1 is lowered by turning the motor M1 on and off according to the duty ratio selected. The flow then comes to the step ST251. Step ST256: The flag DCF is set at "0" and the flow comes to the step ST251.

Interruption by the switch S3:

Step ST257: The flow comes to a step ST259 if the camera is in process of film rewinding or to a step ST258 if the camera is in process of film winding. Step ST258: The operation of the timer T5 is brought to a stop. The motor M1 is turned off. The flag M1F is set at "0". The flow then comes to the step ST251. Step ST259: The flag DCF is set at "0". The flow comes to the step ST251.

Interruption by the timer T5:

Step 260: The flow comes to a step ST265 if the camera is in process of film rewinding or to a step ST261 if the camera is in process of film winding. Step ST261: The motor M1 is turned off. Step ST262: A check is made for the driving state of the motor M1. If it is found to be in the mode "Hi", the flow comes to a step ST264. If it is in the mode "Lo", the flow comes to a step ST263. Step ST263: The flag M1F is set at "0" and, then the flow comes to the step ST251. Step ST264: The flag HLF is set at "1" and, the flow comes to the step ST240. Step ST265: The motor M2 is turned off. The flag M2F is set at "0". The flow comes to a step ST266. Step ST266: The flow comes back to the program preceding the interruption.

Subroutine for controlling the motor M2:

Step ST270: The instruction of the CPU1 for controlling the motor M2 (command bits "2" and "3") is checked. The flow come to a step ST282 if it is an instruction for stopping or to a step ST271 if it is a driving instruction. Step ST271: The flag M2F which shows the operation of the motor M2 is checked. If the flag M2F is at "1" (indicating that the motor M2 is in action), the flow comes to a step ST275. If the flag M2F is at "0" (indicating that the motor M2 is in repose), the flow proceeds to a step ST272. Step ST272: The motor M2 is checked for its driving mode. The flow comes to a step ST273 if the motor M2 is in the charging mode (forward rotation) or to a step ST320 if the motor is in the film rewinding mode (reverse rotation). Step ST273: The output level of the port PA2 is set at "H" and that of the port PA3 at "L" to cause the motor M2 to forwardly rotate for mechanical charging. After that, the flag M2F is set at "1". Step ST274: The register TR2 is set at 200 ms. The timer T1 is set at the value of the register TR2 and is allowed to begin to operate. The flow then proceeds to a step ST275. Step ST275: An interruption is allowed. Step ST276: The flow comes back to the main program.

Interruption by the switch CHG1:

Step ST280: The timer T1 is stopped from operating. The flag CHGF is set at "0". Step ST281: The flag M2F is checked. The flow comes to a step ST282 if the flag M2F is at "1" or to a step ST308 if the flag is at "0". Step ST282: The motor M2 is turned off. The flag M2F is set at "0". The flow then comes to a step ST289.

Interruption by the timer T1:

Step ST283: The flag CHGF is set at "1". Step ST284: The flag M2F is checked. The flow comes to the step ST282 if the flag M2F is at "1" or to a step ST285 if the flag M2F is at "0". Step ST285: The driving mode of the motor M3 is checked. The flow proceeds to a step ST286 if the motor M3 is in the mode "Hi" (forward rotation) or to a step ST308 if the motor is in the mode "Lo" (reverse rotation). Step ST286: The motor M3 is turned off. The flow waits for 10 ms. Step ST287: The motor M3 is set into the mode "Lo". The register TR2 is set at 300 ms. The flag HLF is set at "1". The flow comes to a step ST288.

Interruption by the switch CHG2:

Step ST288: The timer T1 is set at the value of the register TR2. The flow proceeds to a step ST289. Step ST289: An interruption is allowed. Step ST290: The flow comes back to the program preceding the interruption.

Subroutine for controlling the motor M3:

Step ST300: An instruction of the CPU1 for controlling the motor M3 (command bits "4" and "5") is checked. The flow comes to a step ST308 if the instruction is for stopping the motor M3 or to a step ST301 if the instruction is for driving. Step ST301: The flag M3F for the operation of the motor M3 is checked. If the flag M3F is found to be at "1" (indicating that the motor is in action), the flow comes to a step ST304. If the flag is at "0" (indicating that the motor is in repose), the flow proceeds to a step ST302. Step ST302: The driving mode of the motor M3 is checked. The flow comes to a step ST303 if the motor M3 is found to be in the mode "Hi" (forward rotation) or to a step ST307 if the motor is in the mode "Lo" (reverse rotation). Step ST303: The output level of the port PA4 is set at "H" and that of the port PA5 at "L" to cause the motor M3 to forwardly rotate. The flag M3F is set at "1". The register TR2 is set at 100 ms. The flow proceeds to a step ST304. Step ST304: The timer T1 is set at the value of the register TR2 and is allowed to begin to down count. Step ST305: An interruption is allowed. Step ST306: The flow comes back to the main program. Step ST307: The output level of the port PA4 is set at "L" and that of the port PA5 at "H" to cause the motor M3 to reversely rotate. The flag M3F is set at "1". The register TR2 is set at 300 ms. The flow comes to the step ST304. Step ST308: The motor M3 is turned off. The flag M3F is set at "0". The flow then comes to the step ST305.

Film rewinding by the motor M2:

Step ST320: The output level of the port PA0 is set at "H" and that of the port PA3 at "L" to cause the motor M1 to forwardly rotate for 50 ms. Step ST321: The output level of the port PA0 is set at "L" and that of the port PA3 also at "L" to turn off the motor M1. Step ST322: The output level of the port PA2 is set at "L" and that of the port PA3 at "H" to cause the motor M2 to reversely rotate. Step ST323: The flow waits till three pulses are received from the switch S2. Step ST324: The output level of the port PA2 is set at "H" and that of the port PA3 also at "H" to promptly bring the motor M2 to a stop by brake application. The flow waits 30 ms. Step ST325: The output level of the port PA2 is set at "L" and that of the port PA3 at "H" to cause the motor M2 to reversely rotate for film rewinding. The flag M2F is set at "1". Step ST326: The register TR1 is set at 200 ms. The timer T5 is set at the value of the register TR1 and is allowed to begin to operate. The flow then come to the step ST305.

The camera system described above as the embodiment of this invention is arranged to have the motor which is disposed within the motor drive device connected at least to one of the power transmission systems disposed within the camera when the motor drive device is mounted on the camera. Under this condition, motors disposed within the camera are connected to loads other than the power transmission system connected to the motor of the motor drive device. Work is shared by all the motors and power transmission mechanisms disposed within the camera in such a way as to leave no mechanism nor motor idle. The invention, therefore, gives a compact, light-weight photographic apparatus having efficient power transmission systems. In other words, the embodiment comprises a compact, light-weight camera of the motor incorporating type which is capable of forming a rational power transmission system in conjunction with a motor drive device when the latter is mounted thereon; and the motor drive device which is capable of forming a rational power transmission system in conjunction with the camera when mounted on the camera.

Further, when the motor drive device is mounted on the camera, the auxiliary motor included in the motor drive device tentatively drives through couplers a mechanism disposed within the camera for confirmation of perfect coupling. No photographing operation would be allowed if the mechanism disposed within the motor drive device is imperfectly coupled with the applicable mechanism disposed within the camera. Therefore, the invented arrangement eliminates any fear that the film is unsteadily fed or cannot be fed with the motor drive device mounted on the camera.

What is claimed is:

1. A photographic device including a camera body having at least one motor built therein for driving at least one of a film winding transmission system, a charging transmission system and another transmission system, and an accessory detachably mounted on said camera body and having an auxiliary motor built therein, said photographic device comprising:

switching means for switching over the transmission of power in response to the mounting of said accessory on said camera body so that at least one of said film winding transmission system, said charging transmission system and said other transmission system is not able to be connected to said motor built in said camera body, and said one transmission system not connected thereto is able to be driven by said auxiliary motor built in said accessory.

2. A device according to claim 1, wherein said camera body has a first motor and a second motor both built therein, at least one of said first motor and said second motor being able to drive, by a rotation in one direction, a first transmission system of said plurality of transmission systems and to drive, by a rotation in another direction, a second transmission system of said plurality of transmission systems when said accessory is not mounted on said camera body, and wherein said accessory has a third motor built therein; said third motor being able to drive one of said first and second transmission systems when said accessory is mounted on said camera body.

3. A device according to claim 1, further comprising second switching means for switching over a speed reduction ratio in response to the mounting of said accessory on said camera body so that a speed reduction ratio of at least one of said plurality of transmissions in said camera body is lowered to drive said one transmission system at a high speed.

4. A device according to claim 1, further comprising third switching means for switching over a driving voltage of said motor built in said camera body in response to the mounting of said accessory on said camera body so that a driving voltage of said motor built in said camera body is heightened to cause said motor to perform a high-speed driving.

5. A device according to claim 3, further comprising third switching means for switching over a driving voltage of said motor built in said camera body in response to the mounting of said accessory on said camera body so that a driving voltage of said motor built in said camera body is heightened to cause said motor to perform a high-speed driving.

6. A device according to claim 1, wherein said switching means includes a movement member arranged to move in response to the mounting of said accessory on said camera body, said movement limiting a transmission pat of said motor.

7. A device according to claim 4, wherein said switching means includes detection means for electrically detecting the mounting of said accessory on said camera body, and wherein said third switching means switches over a driving voltage of said motor built in said camera body in response to an output of said detection means.

8. A camera body adapted to detachably mount thereon an accessory having an auxiliary motor built therein, comprising:
  (a) at least one motor;
  (b) a first transmission system and a second transmission system both arranged to be driven by said motor; and
  (c) switching means for switching over the transmission of power in response to the mounting of said accessory on said camera body so that said second transmission system is not able to be driven by said motor but is able to be driven by said auxiliary motor.

9. A camera body according to claim 8, wherein when said accessory is not mounted on said camera body, said motor is able to drive, by a rotation in one direction, said first transmission system and to drive, by a rotation in another direction, said second transmission system, and wherein when said accessory is mounted on said camera body, said motor is able to drive, by a rotation in said one direction, said first transmission system, and said auxiliary motor is able to drive said second transmission system.

10. A camera body according to claim 8, further comprising second switching means for switching over a speed reduction ratio in response to the mounting of said accessory on said camera body so that a speed reduction ratio of at least one of said plurality of transmissions in said camera body is lowered to drive said on transmission system at a high speed.

11. A camera body according to claim 8, further comprising third switching means for switching over a driving voltage of said motor built in said camera body in response to the mounting of said accessory on said camera body so that a driving voltage of said motor built in said camera body is heightened to cause said motor to perform a high-speed driving.

12. A camera body according to claim 8, wherein said switching means includes a movement member arranged to move in response to the mounting of said accessory on said camera body, said movement limiting a transmission path of said motor.

13. A camera body according to claim 11, wherein switching means includes detection means for electrically detecting the mounting of said accessory on said camera body, and wherein said third switching means switches over a driving voltage of said motor built in said camera body in response to an output of said detection means.

14. A photographic device including an accessory having an auxiliary motor built therein and a first coupler serving as an output of a power transmission mechanism, a camera body adapted to detachably mount said accessory thereon and having a second coupler arranged to be coupled to said first coupler at the time of the mounting for transmitting power to a mechanism in said camera body, said photographic device comprising:
  detection means for detecting the mounting of said accessory on said camera body; and
  drive means for driving said auxiliary motor when the mounting has been detected by said detection means to cause the mechanism in said camera body to be tentatively driven through said first and second couplers.

15. A device according to claim 14, further comprising judgment means for judging whether or not the mechanism in said camera body performs a predetermined operation when being tentatively driven by said drive means.

16. A device according to claim 15, further comprising operation prohibiting means for prohibiting said auxiliary motor from being driven when said judgment means has judged that the mechanism in said camera body has not performed the predetermined operation.

* * * * *

UNITED STATES PATENT AND TRADEMARK OFFICE
CERTIFICATE OF CORRECTION

PATENT NO. : 4,969,000

DATED : November 6, 1990

INVENTOR(S) : Tsunemasa Ohara, et al.

It is certified that error appears in the above-identified patent and that said Letters Patent is hereby corrected as shown below:

Title page:

--[30] Foreign Application Priority Data:

Aug. 16, 1988 [JP] Japan ........ 63-203571
Aug. 16, 1988 [JP] Japan ........ 63-203576--.

COLUMN 1:

Line 41, "the" should be deleted.

COLUMN 2:

Line 9, "device . and" should read --device and--.

COLUMN 7:

Line 17, "su gear 111" should read --sun gear 111--.

COLUMN 9:

Line 59, "the" (first occurrence) should be deleted.

COLUMN 14:

Line 45, "protrude" should read --protrudes--.

UNITED STATES PATENT AND TRADEMARK OFFICE
CERTIFICATE OF CORRECTION

PATENT NO. : 4,969,000

DATED : November 6, 1990

INVENTOR(S) : Tsunemasa Ohara, et al.

It is certified that error appears in the above-identified patent and that said Letters Patent is hereby corrected as shown below:

COLUMN 18:

Line 17, "a" should read --as--.

COLUMN 22:

Line 5, "sponds" should read --spond--.

COLUMN 26:

Line 1, "us" should read --use--.

COLUMN 31:

Line 40, "parts" should read --ports--.

COLUMN 32:

Line 33, "come" should read --comes--.

COLUMN 33:

Line 60, "come" should read --comes--.

COLUMN 34:

Line 12, "which" should be deleted.

UNITED STATES PATENT AND TRADEMARK OFFICE
CERTIFICATE OF CORRECTION

PATENT NO. : 4,969,000

DATED : November 6, 1990

INVENTOR(S) : Tsunemasa Ohara, et al.

It is certified that error appears in the above-identified patent and that said Letters Patent is hereby corrected as shown below:

COLUMN 35:

Line 14, "pat" should read --path--.

COLUMN 36:

Line 1, "on" should read --one--.

Signed and Sealed this

Twenty-fourth Day of November, 1992

Attest:

DOUGLAS B. COMER

*Attesting Officer*   *Acting Commissioner of Patents and Trademarks*